(12) United States Patent
Hattori et al.

(10) Patent No.: US 9,081,612 B2
(45) Date of Patent: Jul. 14, 2015

(54) VIRTUAL MACHINE CONTROL METHOD AND VIRTUAL MACHINE

(71) Applicant: Hitachi, Ltd., Tokyo (JP)

(72) Inventors: Naoya Hattori, Yokohama (JP); Hitoshi Hayakawa, Yokohama (JP); Yuji Tsushima, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 235 days.

(21) Appl. No.: 13/757,311

(22) Filed: Feb. 1, 2013

(65) Prior Publication Data

US 2013/0247056 A1 Sep. 19, 2013

(30) Foreign Application Priority Data

Mar. 16, 2012 (JP) .................................. 2012-060470

(51) Int. Cl.
*G06F 9/455* (2006.01)
*G06F 9/46* (2006.01)
*G06F 9/48* (2006.01)
*G06F 9/50* (2006.01)

(52) U.S. Cl.
CPC .......... *G06F 9/4881* (2013.01); *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/50* (2013.01); *G06F 9/505* (2013.01); *G06F 9/5005* (2013.01); *G06F 9/5027* (2013.01); *G06F 9/5044* (2013.01); *G06F 9/5077* (2013.01); *G06F 9/5083* (2013.01); *G06F 9/5088* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 6,721,273 B1* | 4/2004 | Lyon | 370/235 |
| 8,156,253 B2 | 4/2012 | Watanabe | |
| 2007/0083862 A1* | 4/2007 | Wooldridge et al. | 718/1 |
| 2008/0184227 A1* | 7/2008 | Matsumoto et al. | 718/1 |
| 2009/0007112 A1 | 1/2009 | Moriki et al. | |
| 2009/0133016 A1* | 5/2009 | Brown et al. | 718/1 |
| 2009/0313391 A1* | 12/2009 | Watanabe | 710/8 |
| 2011/0072428 A1* | 3/2011 | Day et al. | 718/1 |
| 2011/0225591 A1* | 9/2011 | Wada et al. | 718/103 |
| 2011/0296407 A1* | 12/2011 | Bhandari et al. | 718/1 |
| 2012/0084777 A1* | 4/2012 | Jayamohan | 718/1 |
| 2012/0185851 A1* | 7/2012 | Zhang et al. | 718/1 |
| 2013/0104124 A1* | 4/2013 | Tsirkin et al. | 718/1 |

FOREIGN PATENT DOCUMENTS

| | | | |
|---|---|---|---|
| JP | 2009-003749 A | 1/2009 | |
| JP | 2009-301162 A | 12/2009 | |

* cited by examiner

*Primary Examiner* — Charles Swift
(74) *Attorney, Agent, or Firm* — Foley & Lardner LLP

(57) ABSTRACT

A virtual machine control method and a virtual machine having the dual objectives of utilizing NIC on a virtual machine that creates sub-virtual machines operated by a VMM on virtual machines generated by a hypervisor to avoid software copying by the VMM and to prevent band deterioration during live migration or adding sub-virtual machines. In a virtual machine operating plural virtualization software on a physical machine including a CPU, memory, and multi-queue NIC; a virtual multi-queue NIC is loaded in the virtual machine, for virtual queues included in the virtual multi-queue NIC, physical queues configuring the multi-queue NIC are assigned to virtual queues where usage has started, and the physical queues are allowed direct access to the virtual machine memory.

12 Claims, 29 Drawing Sheets

FIG. 8

| VIRTUAL MACHINE NO. 620 | VIRTUAL NIC NO. 700 | VIRTUAL QUEUE NO. 710 | CURRENT TOTAL TRANSFER QUANTITY 720 | PRECEDING TOTAL TRANSFER QUANTITY 730 | ACTUAL MEASUREMENT TRANSFER SPEED 740 |
|---|---|---|---|---|---|
| 1 | 0 | 0 | 4298GB | 4297GB | 1GB/s |
| 1 | 0 | 1 | 0GB | 0GB | 0GB/s |
| .. | .. | .. | .. | .. | .. |
| 16 | 3 | 3 | 545GB | 540GB | 5GB/s |

| VIRTUAL MACHINE NO. 620 | VIRTUAL NIC NO. 700 | VIRTUAL QUEUE NO. 710 | MAC ADDRESS 750 | COMMUNICATION STATUS 780 | TRANSMISSION BUFFER ADDRESS 790 | RECEIVING BUFFER ADDRESS 795 |
|---|---|---|---|---|---|---|
| 1 | 0 | 0 | 012345678900 | START | 0xAAAAAAAA | 0xBBBBBBBB |
| 1 | 0 | 1 | 012345678901 | STOP | 0xCCCCCCCC | 0xDDDDDDDD |
| .. | .. | .. | .. | .. | .. | .. |
| 16 | 3 | 3 | 0123456789FF | START | 0xEEEEEEEE | 0xFFFFFFFF |

| VIRTUAL MEMORY BEGINNING ADDRESS | SIZE | SUB-VIRTUAL MACHINE NO. | SUB-VIRTUAL MEMORY BEGINNING ADDRESS |
|---|---|---|---|
| 0x040000000 | 0x080000000 | 1 | 0x000000000 |
| 0x0C0000000 | 0x040000000 | 2 | 0x000000000 |
| .. | .. | .. | .. |
| 0x200000000 | 0x100000000 | NOT ASSIGNED | NOT ASSIGNED |

VIRTUAL MACHINE CONTROL METHOD AND VIRTUAL MACHINE

CLAIM OF PRIORITY

The present application claims priority from Japanese patent application JP 2012-060470 filed on Mar. 16, 2012, the content of which is hereby incorporated by reference into this application.

FIELD OF THE INVENTION

The present invention relates to a virtual machine, and relates in particular to I/O processing technology when further operating a VMM (virtual machine manager) on the virtual machine.

BACKGROUND OF THE INVENTION

Along with fuller and expanded open server performance and functions, server virtualizing software (VMM: Virtual Machine Manager) has come into wide use as a method for efficiently utilizing the CPU core mounted in the server. The VMM creates a plurality of virtual machines by virtualizing the CPU mounted in one physical server and computer resources such as the memory and I/O device, to operate OS and applications on the respective virtual machines.

Virtualization support functions are gradually becoming utilized in the CPU, memory, or I/O devices in order to alleviate the drop in performance (overhead) that accompanies VMM processing. Intel Corporation and AMD Corporation respectively provide VT-x (Virtualization Technology for x86) for executing VMM functions and SNV (Secure Virtual Machine), as well as VT-d (Virtualization Technology for devices) to allow directly operating the memory from an I/O device and IOMMU (Input/Output Memory Management Unit).

The performance required for virtualizing NIC (Network Interface Cards) that drastically improve communication bands is becoming important in I/O devices. Whereupon multi-queue NIC capable of mounting a plurality of queues (modules providing send and receive functions for network frames) in the virtual machine then appeared. Technology known in the related art for implementing multi-queue NIC includes the VMDq (Virtual Machine Device queue) by Intel Corporation, and SR-IOV (Single Root I/O Virtualization) standardized for conformance to PCI (Peripheral Component Interconnect) standards, etc.

In the VMDq and SR-IOV the software operates the I/O by way of different interfaces. Rather than just a queue, the NIC must also provide a PCI configuration register for holding basic I/O device information. In the VMDq, the PCI configuration register is only one set and functions to provide just a plurality of queues. The SR-IOV on the other hand functions to provide plural sets of queue and a PCI configuration register. Each of these sets contains minimum functions called VF (Virtual Functions) for use as autonomous NIC. In the SR-IOV, the module controlling the entire I/O card including the VF is called a PF (Physical Function).

Until the appearance of the multi-queue NIC, VMM required a software process (software copy) to receive all frames, and copy the frames to the memory of a suitable virtual machine after investigating the destination of each frame. However, as the network band improved to 1 Gbps and 10 Gbps this software copying became a bottleneck that prevented utilizing the band of the physical NIC. In multi-queue NIC on the other hand, each queue is independently assigned to the virtual machine so software copying is not needed since the frames are conveyed directly to the memory in the virtual machine.

Technology for utilizing this multi-queue NIC is disclosed for example in the US Patent Application Publication No. 2009-0133016 specification. The US Patent Application Publication No. 2009-0133016 discloses an I/O management partition scheme for controlling I/O devices including common functions conforming to SR-IOV.

Configurations utilizing a combination of two VMM having different characteristics are starting to be proposed in order to reduce the drop (overhead) in virtual machine performance. If for example a VMM (hereafter, called Lv1, VMM) capable of creating a large number of virtual machines with minimal computer resources could be made to operate on a virtual machine created by a VMM (hereafter called a Hypervisor) highly resistant to hardware faults, then a large number of virtual machines can be safely operated.

Technology to implement such a configuration is known for example in Japanese Unexamined Patent Application Publication No. 2009-3749. This Japanese Unexamined Patent Application Publication No. 2009-3749 discloses technology for "executing a user program comprised of a next generation OS containing virtual functions on a first virtual processor by selecting a guest status area for executing a user program on a second virtual processor and a host status area for executing the guest VMM according to the cause of the host VMM call-up, and rewriting the guest status area of the shadow VMCB for controlling the physical processor."

The multi-queue NIC is technology provided for configurations utilizing just one VMM; however there was a need for utilizing virtual machines (hereafter called sub-virtual machines) on Lv1 VMM over a wide band even in configurations combining two VMM. Moreover, these virtual machines were easily added, possessing the feature of flexibility allowing live migration for moving to other physical computers while still in operation and this flexibility was also needed in sub-virtual machines.

A hypervisor implemented on a physical computer in a configuration combining two VMM, and assigns resources such as NIC installed on the physical computer to the virtual machines. The VMM operated on the virtual machine, further reassigns resources installed in the virtual machine to the sub-virtual machines. The OS and applications are operated on the sub-virtual machines.

Technology utilizing multi-queue NIC on a plurality of VMM is described for example in Japanese Unexamined Patent Application Publication No. 2009-301162. In Japanese Unexamined Patent Application Publication No. 2009-301162, the VMM is described as a "virtual machine manager" and the virtual machine as an "LPAR." As described in this Japanese Unexamined Patent Application Publication No. 2009-301162, "In an environment where PCI-based SR-IOV devices are assigned by way of the IO switch to plural virtual machine managers on a physical computer; the PF is assigned to a first virtual machine manager, and a plurality of VF are assigned to LPAR for a desired virtual machine manager. When the second virtual machine manager has detected an event from the VF to the PF, it next communicates with the first virtual machine manager where the PF is assigned and executes the PF event on the first virtual machine manager. When the first virtual machine manager has detected an event from the PF to the VF, it next communicates with the second virtual machine manager where the applicable VF is assigned and executes the VF event in the LPAR on the second virtual machine manager."

SUMMARY OF THE INVENTION

Applying the technology of Japanese Unexamined Patent Application Publication No. 2009-301162 to virtual machines utilizing a combination of two VMM, and assigning the virtual multi-queue NIC to each virtual machine by utilizing the technology of Japanese Unexamined Patent Application Publication No. 2009-301162 will allow directly conveying the frame to the sub-virtual machine without utilizing software copying.

However, VMM are generally designed under the precondition of a specified number of multi-queue NIC. Therefore, when using technology of Japanese Unexamined Patent Application Publication No. 2009-301162 the number of sub-virtual machines on each virtual machine, might exceed the number of queues that were assigned at virtual machine startup during adding of sub-virtual machines or live migrations, etc. Here, when the number of sub-virtual machines exceeds the number of multi-queue NIC queues, the multi-queue NIC cannot directly convey the frames to the sub-virtual machines. Along with preventing software copying, this state of too many sub-virtual machines causes a sudden deterioration in band for sub-virtual machines that have not been assigned multi-queue NIC. So restrictions were in some cases applied to the adding of sub-virtual machines or to live migrations in order to maintain a sufficient communication band.

Whereupon in view of the above problem points in the related art, the present invention has the object of securing a peak band by eliminating software copying by the Lv1 VMM and preventing deterioration in band related to live migration and the adding of sub-virtual machines in relation to NIC performance in computer systems that create sub-virtual machines operated by Lv1 VMM, as well as virtual machines created by hypervisors.

The present invention is a virtual machine control method for operating the virtualization unit on a physical computer including a CPU, a memory, and a multi-queue I/O device containing one or more physical queues, and the method includes a first step for the virtualization unit to generate a virtual machine by assigning regions in the memory; a second step for the virtualization unit to provide a virtual multi-queue I/O device containing one or more virtual queues in the virtual machine; a third step for the virtual machine to start using the virtual queues; a fourth step for the virtualization unit to assign the physical queues to the virtual queues whose use has started; and a fifth step for the virtualization unit to allow direct access from the assigned physical queue to the memory region on the virtual machine.

Therefore in the present invention the virtualization unit (hypervisor) assigns physical queues in the I/O device to the virtual queues installed in the virtual memory, and also allows the physical queue to directly access the memory in the virtual machine. Moreover, the hypervisor installs a virtual multi-queue I/O device in the virtual machine so that the second virtualization unit (Lv1 VMM) assigns each queue of the multi-queue NIC to the second virtual machine (sub-virtual machine), and allows direct access from each queue of I/O device to the memory within the sub-virtual machine. The present invention is therefore capable of avoiding implementation of software copying by the hypervisor and Lv1VMM, maintains the peak band of the I/O device, and preventing an increased load on the virtual machine.

Also in the present invention, each virtual machine retains the same number of virtual queues as the physical queues contained in the physical computer, and allots the physical queues to the virtual queues who usage has started so that deterioration in the band relating to an increase in the sub-virtual machines or to live migration can be prevented even if the number of sub-virtual machines is unknown at the point in time that the virtual machine starts.

BRIEF DESCRIPTION OF THE DRAWINGS

FIG. 8 is an example of a virtual queue usage quantity table for holding the frequency of occurrence of virtual queue usage in the first embodiment of the present invention;

FIG. 11 is an example of virtual queue setting data for holding the setup parameters that the Lv1 VMM conveys to each virtual queue in the first embodiment of the present invention;

FIG. 12 is an example of a virtual memory assignment table for holding the corresponding relation between the sub-virtual machine and the virtual memory in the first embodiment of the present invention;

DETAILED DESCRIPTION OF THE PREFERRED EMBODIMENTS

The first embodiment of the present invention is described next based on the attached drawings.

First Embodiment

The example described in the present embodiment utilizes a multi-queue NIC as the multi-queue I/O device conforming to SR-IOV standards. The multi-queue NIC assigns its internal plural queues to the sub-virtual machines, and avoids software copying by way of an IOMMU (VT-d from Intel Corporation or IOMMU from AMD Corporation) that allows direct operation from the I/O device to the memory.

1. Hardware Configuration

Figure 1:
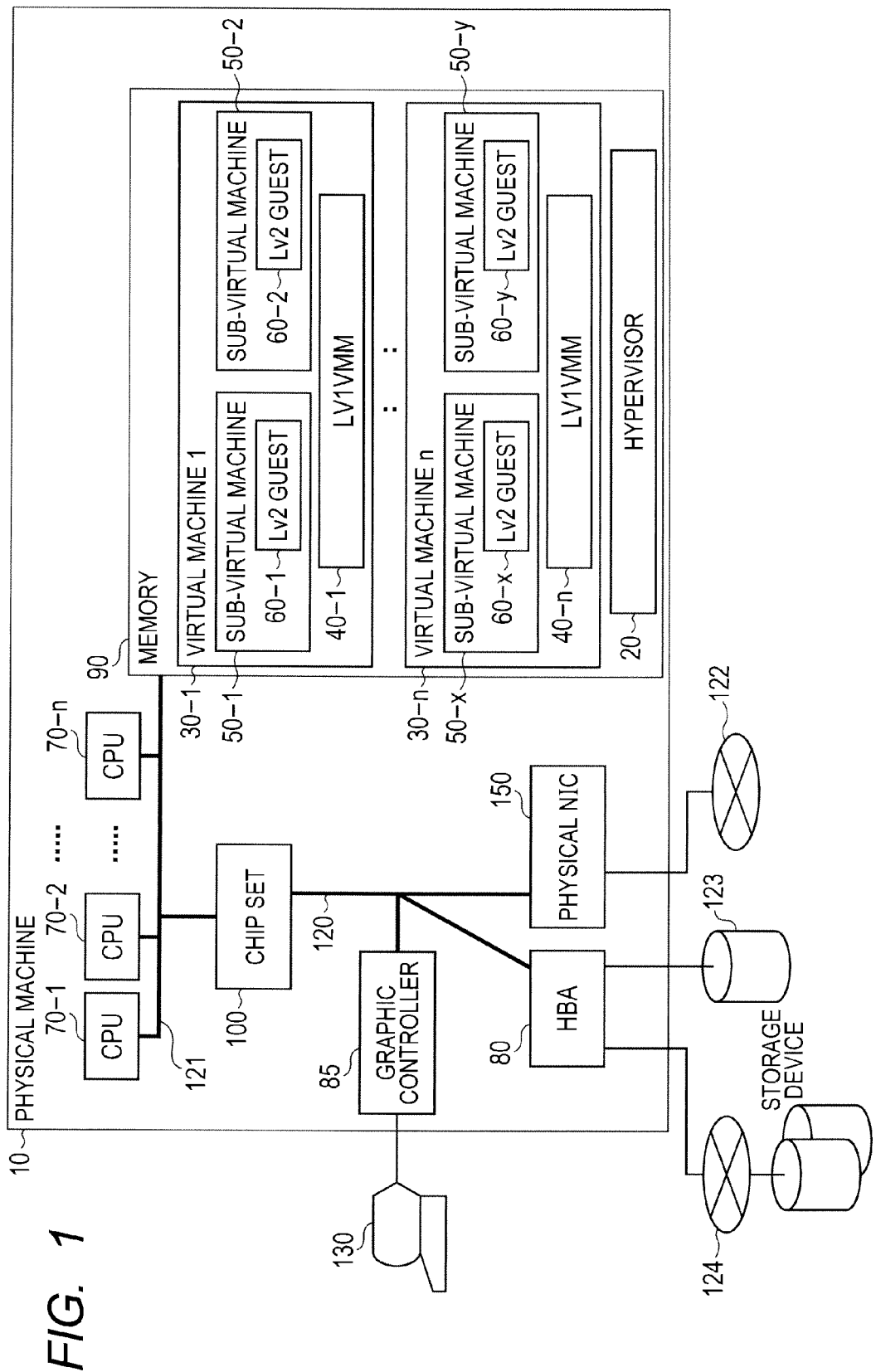
FIG. 1 is a block diagram showing the interrelation of the physical computer and the virtual machine in the first embodiment of the present invention.

FIG. 1 is a block diagram showing one example of the configuration of the physical computer 10 that operates the virtual machine system in the embodiment of the present invention. A physical computer 10 contains one or more CPU70. These CPU70-1 through CPU70-N are coupled to a ChipSet100 or a memory 90 by way of an interconnect 121 such as a QPI (Quick Path Interconnect) or SMI (Scalable Memory Interconnect.) The collective name for the CPU70-1 through 70-$n \leftarrow$"70$n$" in the figure is CPU70, and the collective name for the virtual machines 30-1 through 30-$n$ is the virtual machine 30.

An I/O device is coupled to the Chipset 100 by way of a bus 120 such as PCIexpress. The I/O device may be configured from a physical NIC150 (Network Interface Card) coupled to a LAN122, or a HBA (Host Bus Adapter) 80 coupled to a storage device 123 or SAN124 (Storage Area Network), or a graphic controller 85 coupled to a console 130. The physical NIC150 is hereafter described utilizing an example of an I/O device for multi-queues, containing a plurality of physical queues. The HBA may also be configured from I/O devices for multi-queues. The physical computer 10 may include a plurality of I/O devices such as physical NIC150 or HBA80, etc.

The CPU70 accesses the memory 90 by way of the interconnect 121. Moreover, the CPU70 accesses an I/O device such as the physical NIC150 by way of the ChipSet100 and executes a specified process. An I/O device such as the physical NIC150 in the same way, accesses the memory 90 byway of the ChipSet 100.

The hypervisor 20 is loaded into the memory 90 and executed by the CPU70 to allot a portion of the memory 90 to the virtual machine 30. Moreover, a first level VMM (hereafter, Lv1 VMM) 40 is loaded into the virtual machine 30, and the Lv1 VMM 40 allots a portion of the machine resources of the virtual machine 30 to the sub-virtual machine 50. The OS and application are then loaded into the sub-virtual memory 500 in FIG. 2 the sub-virtual machine 50, and executed by the sub-virtual machine 50-1 through 50-$y$. In the present embodiment, the OS and application loaded into the sub-virtual machine 50 are given the general name of second level (hereafter, Lv2) guest 60-1 through 60-$y$. Moreover, the general name for the Lv1 VMM 40-1 through 40-$n$ is set as Lv1 VMM 40; and the general name for the sub-virtual machines 30-1 through 30-$y$ is set as sub-virtual machine 30; and the general name for the Lv2 guest 60-1 through 60-$y$ is set as Lv2 guest 60. Other structural components are the same so the general term utilize a reference numeral with no suffix.

2. Software Configuration

Figure 2:
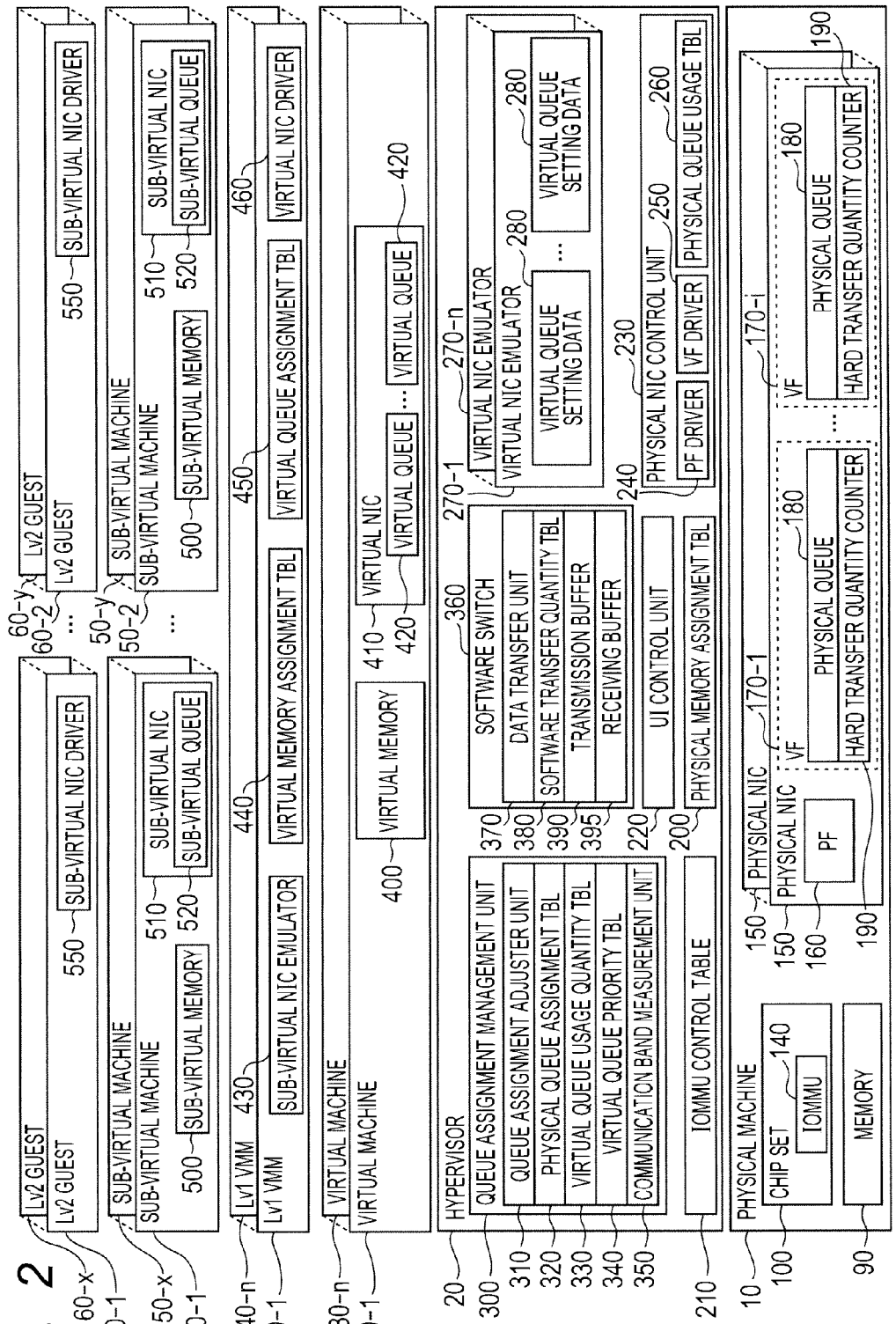
FIG. 2 is a block diagram showing the interrelation of the physical computer and the software in the first embodiment of the present invention.

The essential section of the software configuration implemented on the physical computer 10 is described while referring to FIG. 2 in regards to hardware element subject to control.

FIG. 2 is a block diagram showing the interrelation of the physical computer and the software. A hypervisor 20 for creating the virtual machine 30 operates on the physical computer 10. The Lv1 VMM 40 for creating the sub-virtual machine 50 operates on the virtual machine 30. The Lv2 guest 60 operates on the sub-virtual machine 50.

The physical computer 10 includes the memory 90, the plural physical NIC150, and the ChipSet100 and, an example of the operation when performing communication is described next.

The hypervisor 20 assigns the memory 90 to the virtual machines 30. The physical NIC150 conforms to the SR-IOV standard and contains a VF170 (Virtual Function) that respectively function as autonomous NIC, and a PF160 (Physical Function) for controlling the VF170. The VF170 contains plural physical queues 180 including a function to send data on the memory as network frames, and a function to store the received network frames on the memory. The VF170 includes a hard transfer quantity counter 190 for storing sent and received cumulative data quantities. The ChipSet 100 includes and IOMMU (Input/Output Memory Management Unit) 140 to allow or prohibit direct access according to the address combinations in the VF170 and memory 90.

The hypervisor 20 creates a virtual machine 30, assigns a portion of the memory 90 or physical queue 180 to the virtual machine 30, and provides the virtual memory 400 or virtual NIC410. The virtual NIC410 is a multi-queue NIC containing a VMDq (Virtual Machine Device queue) feature, and contains the same number of virtual queues 420 as the physical queue 180 contained in the physical computer 10.

The hypervisor 20 includes a queue assignment management unit 300 to manage the assignment of the physical queue 180 to the virtual queue 420; a software switch 360 to switchover the network frame sending/receiving functions of the virtual queue 420 when the physical queue 180 is insufficient; virtual NIC emulators 270-1 through 270-n to simulate the virtual NIC410 processing; a physical NIC control unit 230 to control the physical NIC150; an IOMMU control table 210 to specify an accessible memory range for each VF170; a physical memory assignment table (TBL in drawing) 200 to store the range of the memory 90 assigned as the virtual memory 400; and a UI (user interface) control unit 220 to receive for example memory and queue assignment requests from the machine administrator.

The queue assignment management unit 300 includes a queue assignment adjuster unit 310 to decide which virtual queue 420 to assign the physical queue 180; a physical queue assignment table (TBL in drawing) 320 to retain the correspondence between the virtual queue 420 and the physical queue 180; the physical queue usage quantity table (TBL in drawing) 330 retaining the data transfer quantity implemented through use of the virtual queue 420; the virtual queue priority table (TBL in drawing) 340 retaining the assignment priority for physical queues 180 to the virtual queue 420; and a communication band measurement unit 350 to measure the data transfer quantity and data transfer speed achieved utilizing the virtual queue 420.

The software switch 360 includes a data transfer unit 370 to implement the sending and receiving of data by way of the virtual queue 420 and the physical queue 180; a software transfer quantity table (TBL in drawing) 380 for storing the software copy quantity that occurred during mediation (?interfacing?); a transmission buffer 390 to temporarily hold the data on the virtual memory 400 sent from the virtual queue 420 as a software copy, and convey it to the physical queue 180; a receiving buffer 395 to temporarily hold the data received by the physical queue 180 before software copying in a region on the virtual memory 400 specified by the virtual queue 420.

The virtual NIC emulators 270 (virtual device emulator) holds in each of the virtual queues 420, the address of the region in the virtual memory 400 for refreshing or searching by the virtual queue 420, or the virtual queue setting data 280 that holds for example the communication start or stop status.

The physical NIC control unit 230 includes the PF driver 240 for operating the PF160 and initializing the VF170; the VF driver 250 for operating the physical queue 180 and the hard transfer quantity counter 190 contained in the VF170; and the physical queue usage table (TBL in drawing) 260 for monitoring whether the virtual machine or the hypervisor will use each physical queue 180. Here, the hard transfer quantity counter 190 is a counter for holding the data transfer quantity of each physical queue 180.

The Lv1 VMM 40 creates the sub-virtual machines 50, assigns a portion of the virtual memory 400 or the virtual queue 420 to the sub-virtual machines 50, and provides a sub-virtual memory 500 and sub-virtual NIC510, and sub-virtual queue 520 configuring the sub-virtual NIC510.

The Lv1VM40 includes a sub-virtual NIC emulator 430 to simulate the sub-virtual NIC510 processing; a virtual memory assignment table (TBL in drawing) 440 for storing the range of the virtual memory 400 assigned as the sub-virtual memory 500; a virtual queue assignment table (TBL in drawing) 450 for holding the virtual queue 420 assignment to the sub-virtual queue 520; and a virtual NIC driver 460 for controlling the plural virtual queues 420 contained in the virtual NIC410. The virtual NIC driver 460 is called a VMDq compatible driver and is a driver that controls the plural queues of the NIC containing VMDq feature.

The Lv2 guest 60 includes a sub-virtual NIC driver 550 for controlling the sub-virtual NIC510.

Each of the function units such as the queue assignment management unit 300 and software switch 360 and virtual NIC emulator 270 or the physical NIC control unit 230 and so on in the hypervisor 20 are here loaded as programs into the memory 90.

The CPU70 operates as the function units to implement the specified function by executing the operation according to the program in each function unit. The CPU70 for example functions as the queue assignment management unit 300 by performing processing according to the queue assignment processing program. The CPU70 performs the other programs in the same way. The CPU70 further operates other function units that implement the plural respective processes executed by each program. The computer (or machine) and computer system are a device and system containing these function units.

Information such as the programs and tables for implementing each function of the hypervisor 20 or Lv1 VMM 40 and Lv2 guest 60 can be stored in storage devices such as the storage device 123 or non-volatile semiconductor memories, hard disk drives, SSD (Solid State Drive) etc., or non-temporary storage data medium capable of reading by a computer (machine) such as an ID card, SD card, DVD, etc.

In FIG. 2, the hypervisor functions as the first virtualization unit to create the virtual machine unit 30, and operates the Lv1 VMM 40 as the second virtualization unit on the virtual machine 30. The hypervisor then operates the Lv2 guest on the sub-virtual machine 50 created by the Lv1 VMM 40. The plural virtualization units in the present embodiment are configured hierarchically (in layers).

Figure 3:
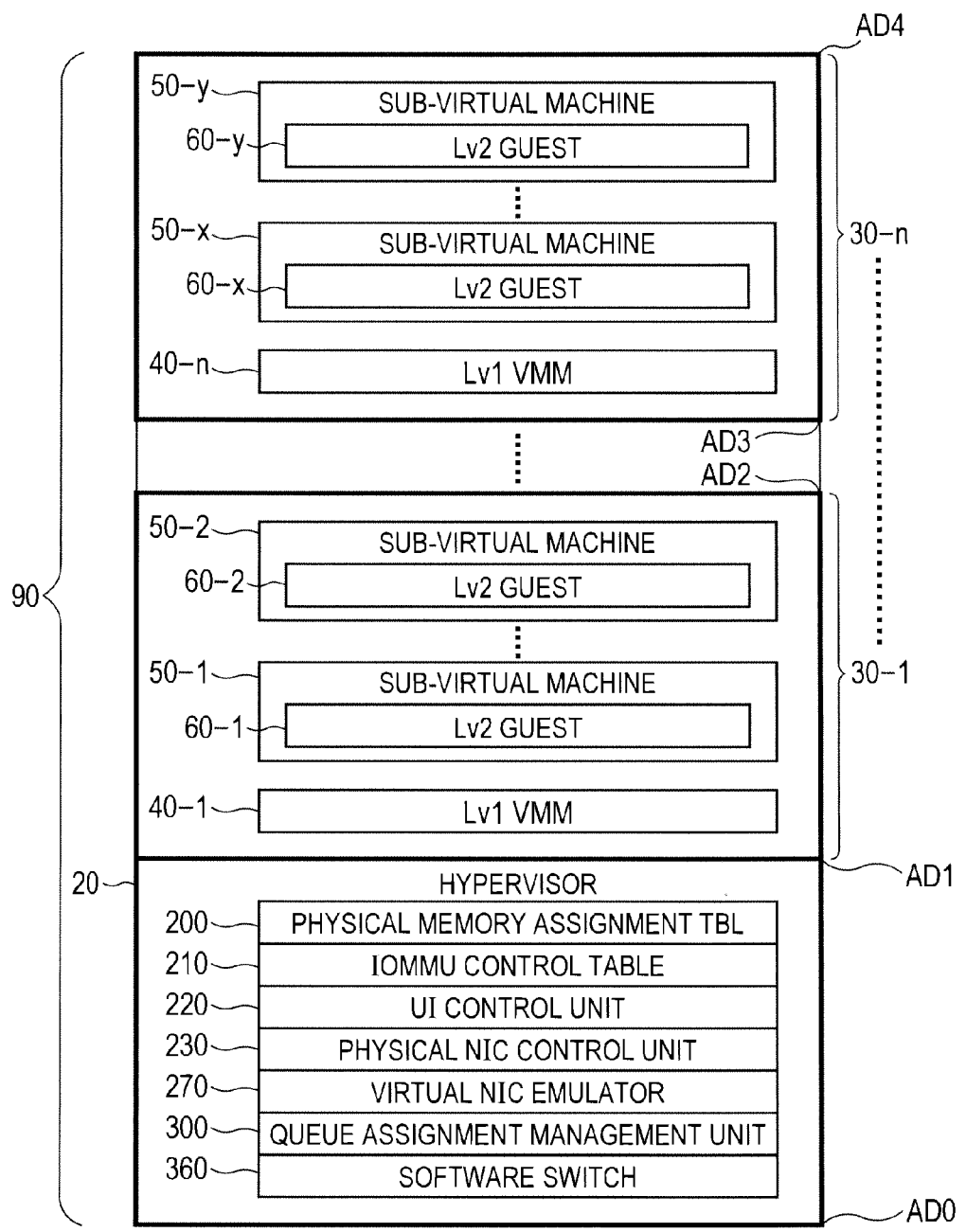
FIG. 3 is an address map showing the contents of the physical memory in the first embodiment of the present invention.

FIG. 3 is one example of the memory 90 managed by the hypervisor 20.

The hypervisor 20 assigns a region on the memory 90 to place itself is located, and assigns a region where plural virtual machines 30 are used as the virtual memory 400.

The hypervisor 20 as already described, includes a memory assignment table (TBL in drawing) 200, an IOMMU control table 210, a UI control unit 220, a physical NIC control unit 230, a virtual NIC emulator 270, a queue assignment management unit 300, and a software switch 360. The hypervisor 20 in FIG. 3 for example places each module while assigning its own addresses AD0 through AD1, and assigns the addresses AD1 through AD2 to the virtual machine 30-1, and assigns the addresses AD3 through AD4 to the virtual machine 30-n. The Lv1 VMM 40 assigns a region on the memory 30 for self-placement and assigns a region where the sub-virtual machine 500 is used as the sub-virtual memory 500. Also, an Lv2 guest 60 is stored within the sub-virtual machine 500.

Figure 4:
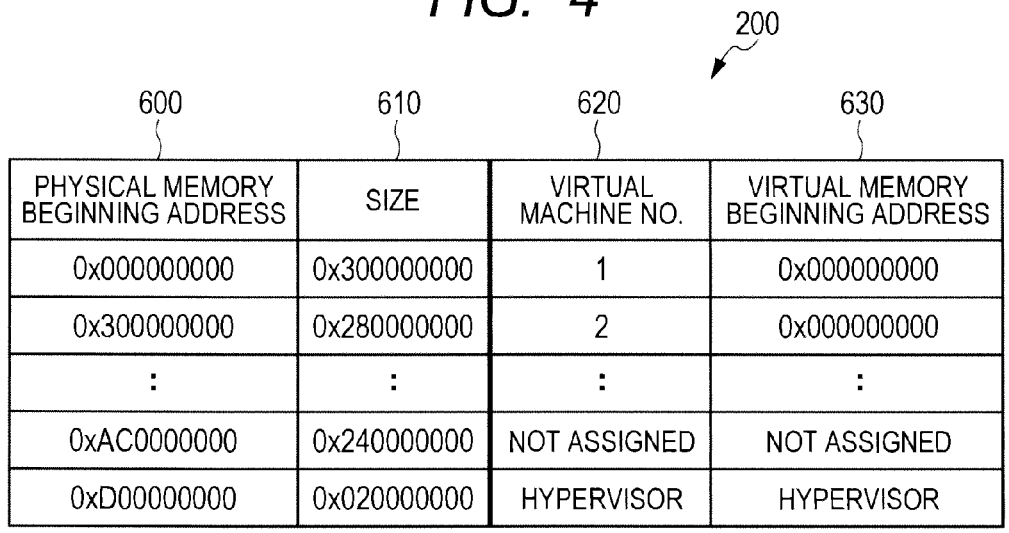
FIG. 4 is an example of a physical memory assignment table for retaining the corresponding relation between the virtual machine and physical memory in the first embodiment of the present invention.

FIG. 4 is an example of the physical memory assignment table 200 that holds the corresponding relation between the virtual machine 30 and the memory 90. The physical memory assignment table 200 is configured as entries storing the virtual memory beginning address 630 of the applicable virtual machine and the virtual machine No. 620 assigned to the applicable region, for the consecutive region of memory 90 specified by the physical memory beginning address 600 and the size 610.

The consecutive region not assigned to the virtual machine 30, stores a numeral signifying non-assignment, in the virtual machine No. 620 and the virtual memory beginning address 630. Moreover, the consecutive region used by the hypervisor 20 stores numeral signifying the hypervisor, in the virtual machine No. 620 and the virtual memory beginning address 630.

The values in each field of the physical memory assignment table 200 can store values set by the hypervisor 20.

Figure 5:
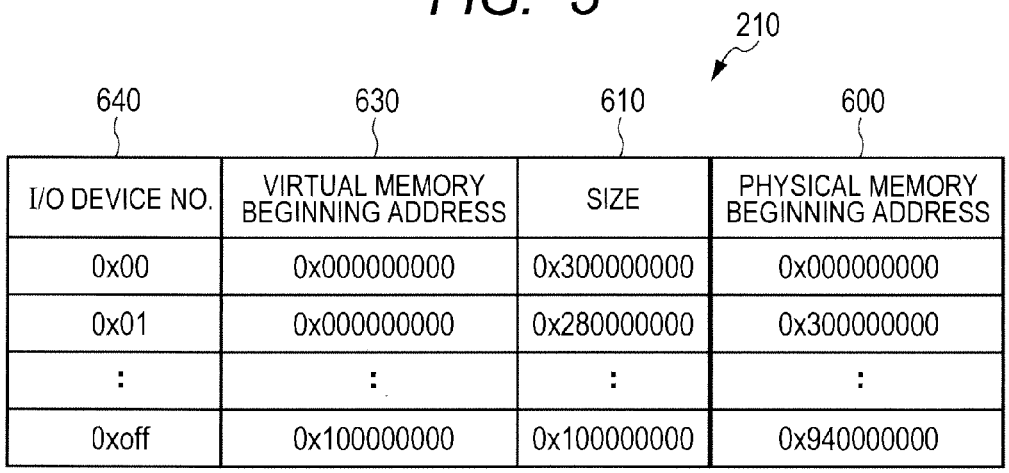
FIG. 5 is an example of an IOMMU control table for setting whether to allow or prohibit memory operation by the I/O device in the first embodiment of the present invention.

FIG. 5 is an example of an IOMMU control table 210 that specifies allowing or prohibiting memory operation by the I/O device such as the physical NIC150, etc. The IOMMU control table 210 is a table that specifies the memory range allowing direct access per the IOMMU140 to an I/O device such as the physical NIC150.

The I/O device No. 640 is a number for identifying the I/O device (physical NIC150 or HBA80), and utilizes the Requester ID of the PCI. If the physical NIC150 conforms to SR-IOV standards, then different settings can be specified for each VF170, since the VF170 each have a Requester ID. The physical memory assignment table 200 holds the virtual memory beginning address 630 and the size 610 in order to specify the address on the virtual memory 400 for allowing I/O device access. The physical memory assignment table 200 also holds the physical memory beginning address 600 in order to specify where the actual virtual memory 400 is located on the memory 90.

The physical memory beginning address 600 and the size 610 of the IOMMU control table 210, and the virtual memory beginning address 630 shown in FIG. 5 are assigned the same reference numerals in field (or columns) storing data of the same type as the physical memory assignment table 2 in FIG. 4, however the stored values in each table are different. The following description for other tables is also the same.

Figure 6:
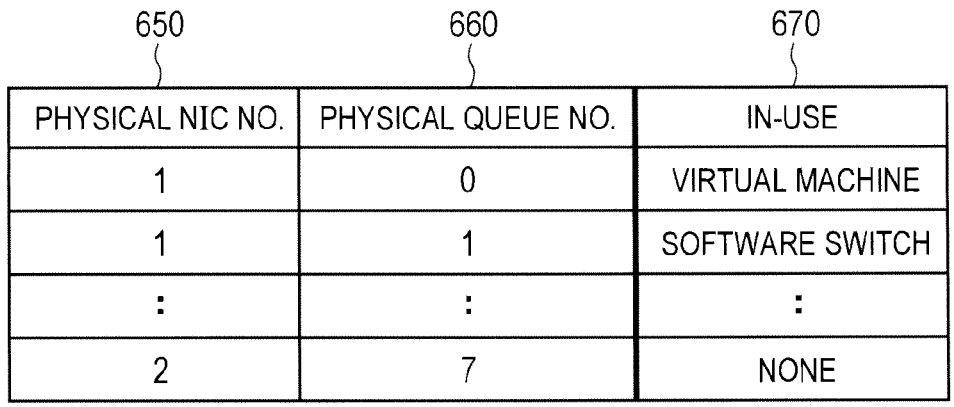
FIG. 6 is an example of a table using physical queues to hold the usage status of the physical queues in the first embodiment of the present invention.

FIG. 6 is an example of the physical queue usage table 260 for holding the usage status of the physical queue 180. The physical queue usage table 260 stores the physical NIC No. 650 attached to each physical NIC150 within the physical computer 10, and the physical queue No. 660 attached to each physical queue within the physical NIC150 as pair for uniquely identifying the physical queue 180. In the User 670 column, a "Virtual Machine" is stored when the physical queue is assigned to any of the virtual machines 30; a "Software Switch" is stored when the physical queue is used by the hypervisor 20 software switch; and a "None" is stored when the physical queue is not used.

The physical NIC No. 650 and the physical queue No. 660 may also store a value input from the console 130 by a supervisor or administrator, etc.

Figure 7:
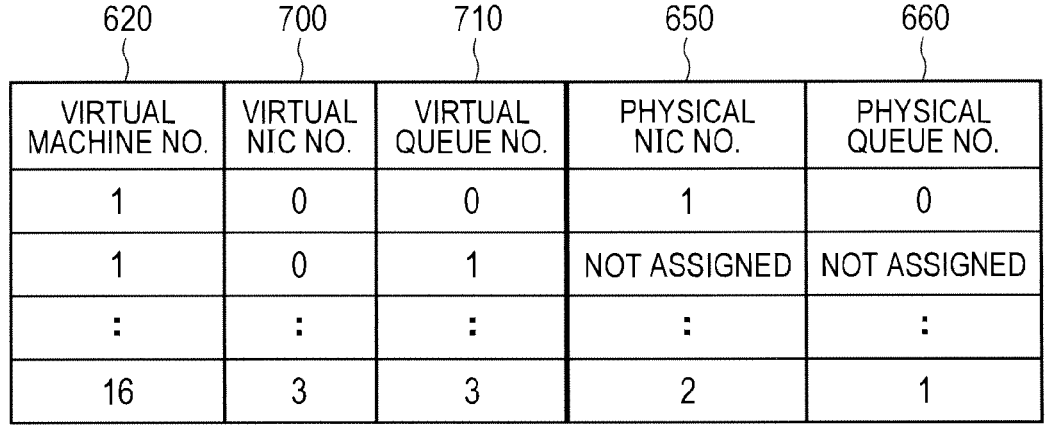
FIG. 7 is an example of a physical queue assignment table for retaining the physical queue assignment to the virtual queue in the first embodiment of the present invention.

FIG. 7 is an example of a physical queue assignment table 320 for holding the physical queue 180 assignment to the virtual queue 420, the physical queue assignment table 320 stores the combination of a virtual machine No. 620, and a virtual NIC No. 700 attached to each virtual NIC410 within the applicable virtual machine, and a virtual queue No. 710 attached to each virtual queue 420 within the applicable virtual NIC, in order to uniquely identify the virtual queue 420. The physical queue assignment table 320 moreover stores a physical NIC No. 650 and physical queue No. 660 in order to uniquely identify the physical queue 180 corresponding to the virtual queue 420. If there is no physical queue 180 assigned to the virtual queue 420, then a value signifying "Not assigned" is stored in the physical NIC No. 650 and physical queue No. 660.

The physical queue assignment table 320 can moreover store the value set by the hypervisor 20 in the virtual machine No. 620, virtual NIC No. 700, virtual queue No. 710.

FIG. 8 is an example of a virtual queue usage quantity table 330 for holding the frequency of occurrence of virtual queue 420 usage. The virtual queue usage quantity table 330 stores a combination of the virtual machine No. 620, virtual NIC No. 700, and virtual queue No. 710 for uniquely identifying the virtual queue 420. In order to also calculate the usage frequency for each virtual queue 420, the total data transfer quantity at the point in time of the last measurement is stored in the current total transfer quantity 720, and the total data transfer quantity at the point in time of the just one step prior (preceding) measurement is stored in the preceding total transfer quantity 730. The hypervisor 20 thereupon stores the virtual queue usage frequency found by dividing the difference between the current total transfer amount 720 and the preceding total transfer amount 730 by the measurement time interval, into the actual measurement transfer speed 740.

The transfer quantity and the transfer speed for each virtual queue No. 710 are values measured at a specified timing by the communication band measurement unit 350.

Figure 9:
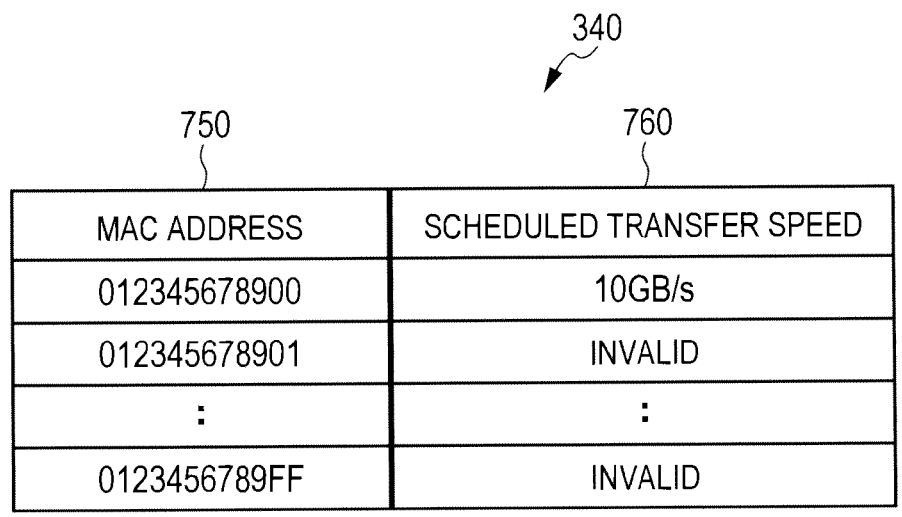
FIG. 9 is an example of a virtual queue priority table for retaining the virtual queue assignment priority in the first embodiment of the present invention.

FIG. 9 is an example of a virtual queue priority table 340 for holding assignment priority of the virtual queue 420. The virtual queue priority table 340 utilizes a MAC (Media Access Control) address 750 for uniquely designating the virtual queue 420. The MAC address is a number for designating the receive destination and the transmit source of the network frame and is set as a common parameter for the physical queue 180, the virtual queue 420, and the sub-virtual queue 520.

The reason for specifying a MAC address in the virtual queue priority table 340 is that the administrator who sets the virtual queue priority table 340 is mainly concerned with the degree of priority centering on the sub-virtual queue 520 and not the virtual queue 420 so that utilizing a number associated with the sub-virtual queue 520 lower the burden on the administrator.

In the virtual queue priority table 340, the communication band scheduled for priority use by each virtual queue 420 is held as the scheduled transfer speed 760. A value signifying "invalid" is stored if there is no designated scheduled transfer speed 760. If there is a valid scheduled transfer speed 760 then instead of the actual measurement transfer speed 740, the scheduled transfer speed 760 is viewed as the usage frequency of the virtual queue, and the priority sequence is reflected during assignment of the physical queue.

Figure 10:
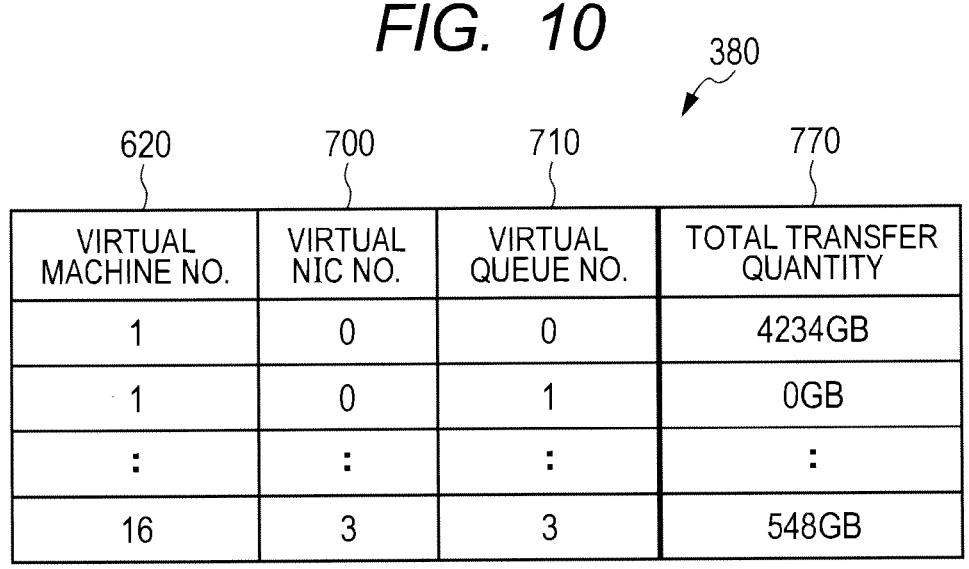
FIG. 10 is an example of a software transfer quantity table for retaining the software copy quantity for each virtual queue in the first embodiment of the present invention.

FIG. 10 is an example of a software transfer quantity table 380 for holding the software quantity copied by the Lv1 VMM 40 for each virtual queue 420. The software transfer quantity table 380 stores a combination of the virtual machine No. 620, virtual NIC No. 700, and virtual queue No. 710 for uniquely identifying the virtual queue 420. The hypervisor 20 stores the total data quantity of the copied software into the total transfer quantity 770.

FIG. 11 is an example of the virtual queue setting data 280 holding the setup parameters that the Lv1 VMM 40 conveyed to the virtual queue 420. The virtual queue setting data 280 stores the combination of virtual machine No. 620, virtual NIC No. 700, and virtual queue No. 710 for uniquely identifying the virtual queue 420.

The setup parameter for the virtual queue 420 includes: the MAC address 750, the communication status 280 showing whether communication with the applicable virtual queue has stopped or started, the transmission buffer address 790 for specifying the position of the data to be sent with the address for specifying the position of the received data to be stored with the address of the virtual memory 400.

FIG. 12 is an example of a virtual memory assignment table 440 for holding the corresponding relation between the sub-virtual machine 50 and the virtual memory 400. For the continuous region specified by the virtual memory beginning address 630 and the size 610, the virtual memory assignment table 440 stores the sub-virtual machine No. 800 assigned to the applicable region and the sub-virtual memory beginning address 810 for the applicable sub-virtual machine. If there is no continuous region assigned to the sub-virtual machine 50, then a value signifying there is no assignment is stored in the sub-virtual machine No. 800 and the sub-virtual memory beginning address 810.

Each field of the virtual memory assignment table 440 can moreover store values set by the Lv1 VMM 40.

Figure 13:
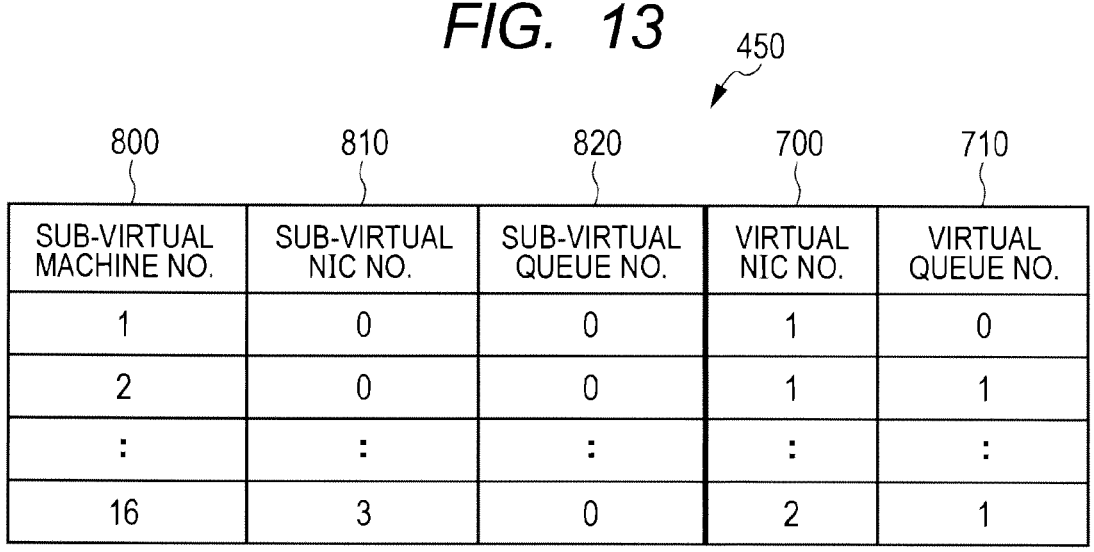
FIG. 13 is an example of a virtual queue assignment table for holding the virtual queue assignment corresponding to the sub-virtual queues.

FIG. 13 is an example of a virtual queue assignment table 450 for holding the virtual queue 420 assignments corresponding to the sub-virtual queue 520. The virtual queue assignment table 450 stores a combination of the sub-virtual machine No. 800, the sub-virtual NIC No. 810 attached to each sub-virtual NIC510 within the applicable sub-virtual machine, and the sub-virtual queue No. 820 attached to each sub-virtual queue 520 within the applicable sub-virtual NIC, in order to uniquely identify the sub-virtual queue 520. The virtual queue assignment table 450 also stores the virtual NIC No. 700 and virtual queue No. 710 for uniquely identifying the virtual queue 420.

Each field in the virtual queue assignment table 450 is capable of storing the values set by the Lv1 VMM 40.

Figure 14:
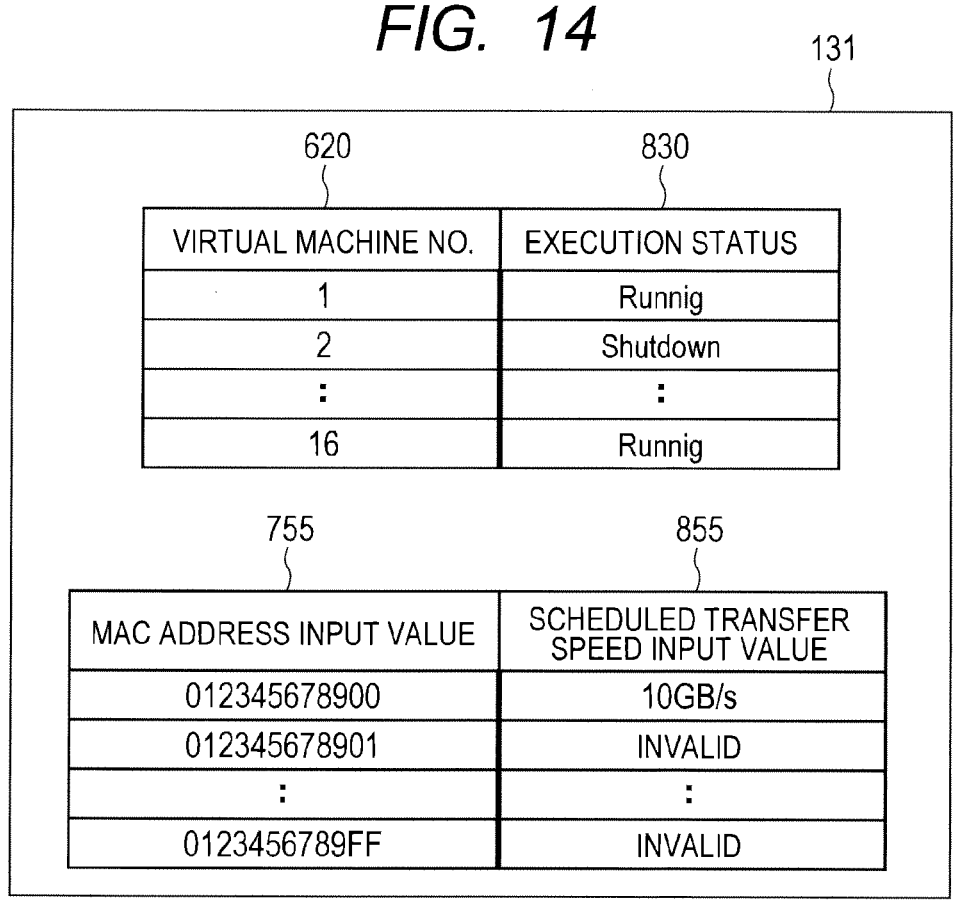
FIG. 14 is an example of a screen image of the user interface shown on the console in the first embodiment of the present invention.

FIG. 14 is an example of the user interface 131 shown on the console 130. The user interface 131 provides a screen showing starting or ending of the virtual machine 30, and priority changes in physical queue assignments to the MAC address.

An execution status 830 is shown for each virtual machine No. 620 on the upper half of the user interface 131. Rewriting the execution status 830 to Running or to Shutdown can instruct the hypervisor 20 to start or stop the virtual machine 30. An input device (keyboard or mouse) not shown in the drawing possessed by the console 130 can be used to rewrite the entries.

A pair comprised of the MAC address input value 755 and a scheduled transfer speed input value 855 are displayed on the lower half of the user interface 131. Rewriting these values changes the degree of priority for the physical queue 180 assigned to the virtual queue 420 set by the specified MAC address 750, and can also instruct reassignment of the physical queue 180.

3. Hypervisor Processing

An example of processing carried out by the hypervisor 20 is described next while referring to the following flowcharts.

Figure 15:
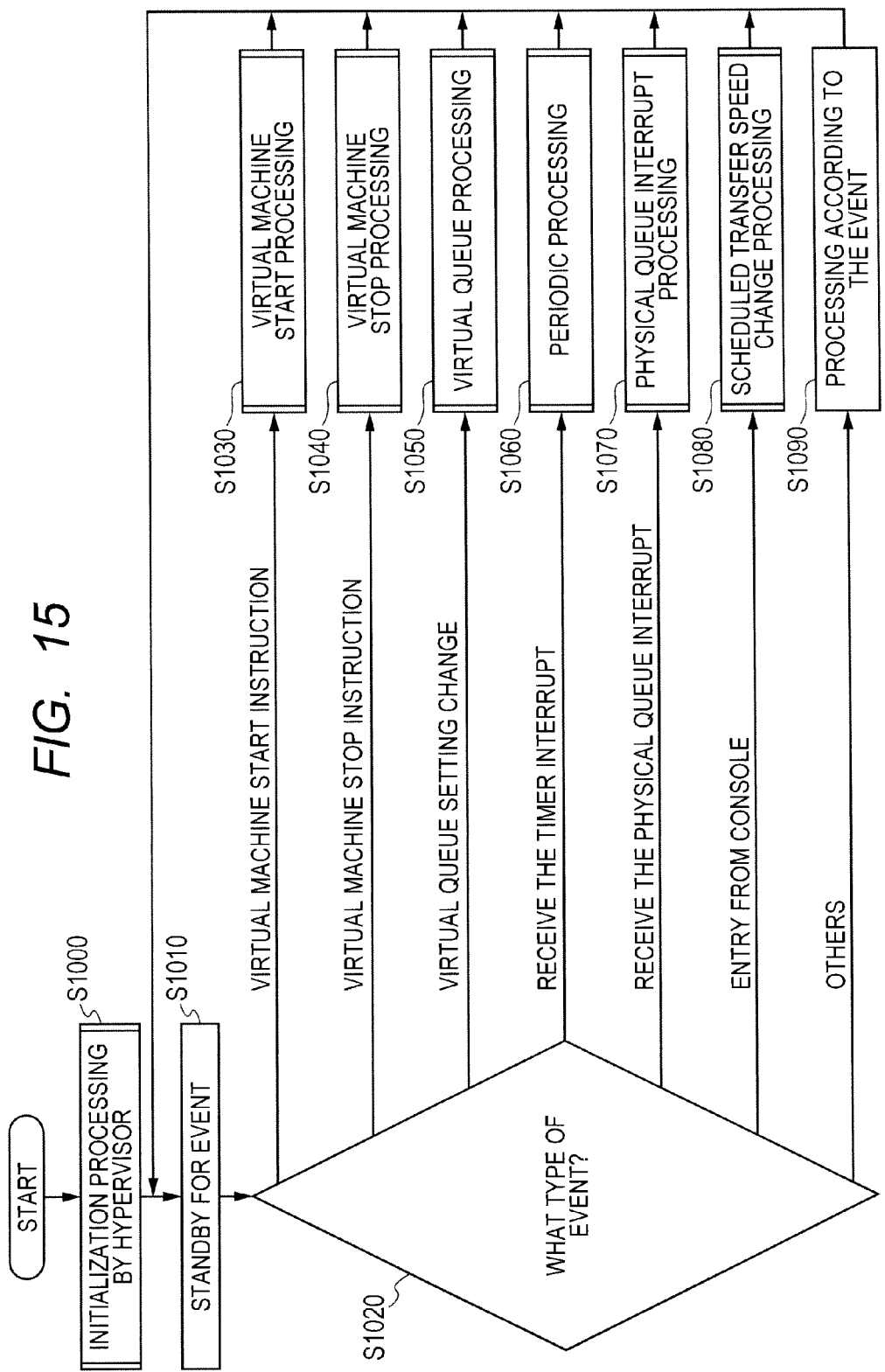
FIG. 15 is an example of a flowchart showing the entire processing implemented by the hypervisor in the first embodiment of the present invention.

FIG. 15 is a flowchart showing an example of the overall processing implemented by the hypervisor 20. The hypervisor 20 starts processing when the power is turned on to the physical computer 10, and initializes each module within the hypervisor 20 in step S1000.

In the following step S1010, the hypervisor 20 waits for an event such as instructions from the console 130 of the administrator, and in step S1020 calls up processing according to the event type that occurred.

In the case that the event that occurred is a startup instruction for the virtual machine, the hypervisor 20 processing transitions to step S1030, and the hypervisor performs resource assignment processing and initializing processing to start the virtual machine 30.

In the case that the event that occurred is processing to stop the virtual machine, then the hypervisor 20 processing transitions to step S1040, and performs resource release processing to stop the virtual machine 30.

When the event that occurred is an instruction for the Lv1 VMM 40 to change the operation settings on the virtual queue 420, the processing transitions to step S1050 and the setting parameters conveyed to the virtual queue 420 are processed to utilize them in the physical queue 180 processing.

When the event that occurred is the receiving a periodic timer interruption (break-in), the processing transitions to step 1060, and periodic processing that is transfer quantity monitoring of the virtual queue 420 is performed.

When the event that occurred is receiving of an interruption (break-in) notifying that the physical queue 180 processing is completed, the processing transitions to step S1070, and the hypervisor 20 itself instructs the physical queue 180 to perform the next operation, or notifies the Lv1 VMM 40 to perform the next virtual queue 420 operation.

When the event that occurred is an entry from the console 130, then the processing transitions to step S1070, and if there is an instruction to change the degree of priority of the physical queue 180 assignment to each virtual queue 420 such as the transfer speed scheduled in the virtual queue 420, then processing is performed to reflect that instruction in the physical queue 180 assignment.

When the event that occurred was another event, the processing transitions to step S1090 and processing identical to that of a typical hypervisor is performed according to the event that occurred.

The hypervisor 20 implements processing according to the event that occurred by repeating the above described processing.

Figure 16:
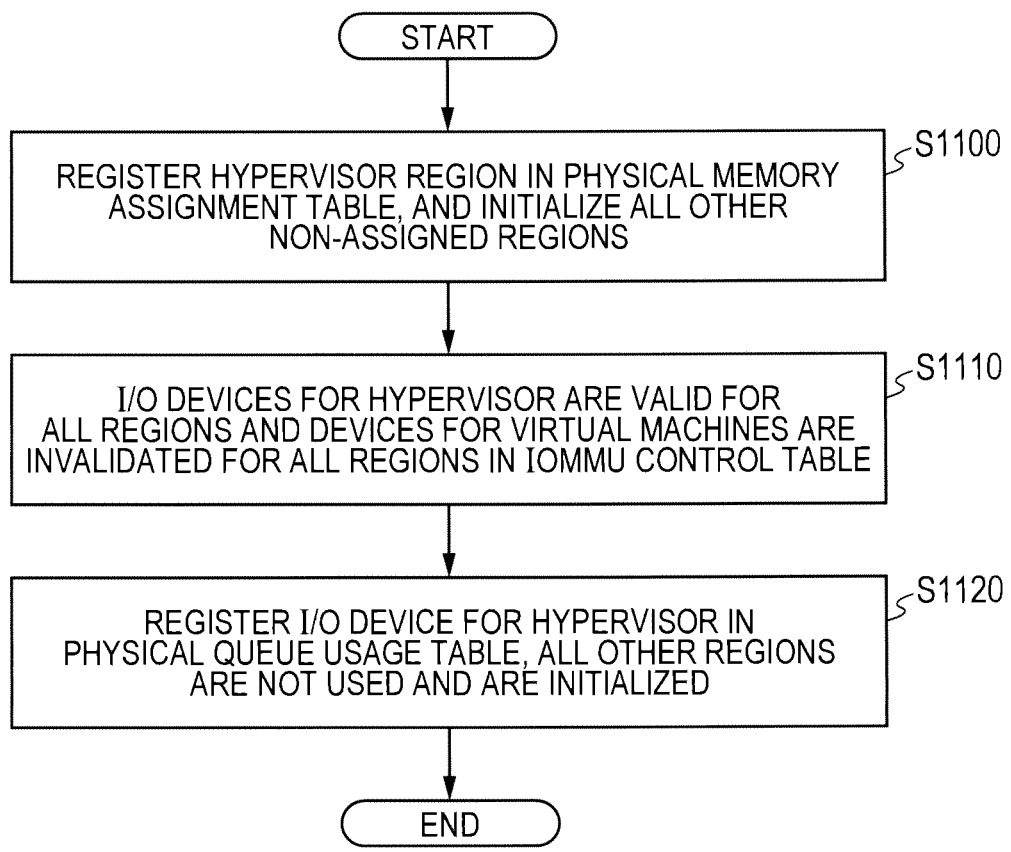
FIG. 16 is a flowchart showing one example of the hypervisor initialization processing in the first embodiment of the present invention.

FIG. 16 is a flowchart showing one example of the hypervisor initialization processing performed in step S1000 in FIG. 15.

In step S1100, the hypervisor 20 registers the physical memory beginning address 600 and the size 610 of the memory 90 used by the hypervisor 20 itself in the first entry of the physical memory assignment table 200, and sets "Hypervisor" in the virtual machine No. 620 and the virtual memory beginning address 630. The hypervisor 20 also registers the physical memory beginning address 600 and the size 610 for all other regions in the second entry, and sets "not assigned" in the virtual machine No. 620 and the virtual memory beginning address 630.

The hypervisor 20 next groups the I/O device such as the VF170 into an I/O device used by the hypervisor itself, and an I/O device assigned to the virtual machine 30. This grouping may for example assign the PF160 and a preset VF170 to the Hypervisor 20, and group the remaining VF170 for use by the virtual machine 30.

Next, in step S1110, the I/O devices used by the hypervisor 20 are registered as I/O device No. 640 for the applicable devices to the IOMMU control table 210, the virtual memory beginning address 630 is set, and the hypervisor memory region registered in S1110 is recorded in the physical memory beginning address 600 and the size 610.

Making this setting allows all I/O devices used by the hypervisor 20 direct access just to the hypervisor 20 memory region. The I/O devices assigned to the virtual machine 30 are not set in the virtual memory beginning address 630 in the IOMMU control table 210 and so are prohibited from directly accessing any memory region.

The hypervisor 20 then in step S1120 initializes the physical queue usage table 260. The I/O devices used in the hypervisor 20 include the VF170 so that the physical NIC No. 650 and the physical queue No. 660 for the applicable VF170 are registered, and the In-use 670 is set to "Software Switch." The VF170 is also included in the I/O devices assigned to the virtual machine 30 so that the In-use 670 is set to "None" for the applicable VF170.

The initializing of the physical memory assignment table 200, the IOMMU control table 210 and the physical queue usage table 260 is completed in the above processing.

Figure 17:
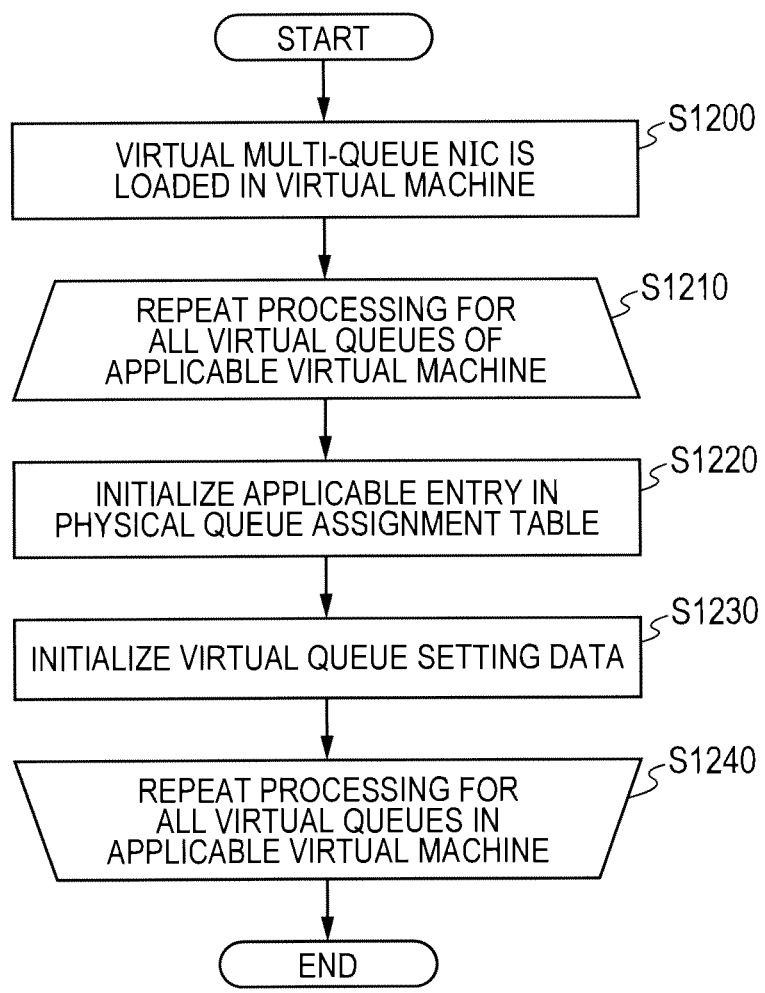
FIG. 17 is a flowchart showing one example of the startup processing of the virtual machine by the hypervisor in the first embodiment of the present invention.

FIG. 17 is a flowchart showing one example of the startup processing of the virtual machine by the hypervisor 20 in step 1030 of FIG. 15. The hypervisor 20 obtains virtual machine resources for the virtual machine 30 that received startup instructions from the console 130 etc., creates a virtual NIC410 containing plural virtual queues 420 in step S1200, and creates a virtual machine 30 containing the applicable virtual NIC410.

Next, all processing in steps S1220 through S1230 is repeated for all virtual queues 420 contained in the applicable virtual machine 30 to rewrite each type of table contained in the hypervisor 20. Next, in step 1220, the virtual machine No. 620, the virtual NIC No. 700, the virtual queue No. 710 are recorded as identifiers for the applicable virtual queue 420 in the physical queue assignment table 320 within the queue assignment management unit 300, and a "No assignment" is recorded in the physical NIC No. 650 and the physical queue No. 660. In step 1230, the virtual machine No. 620, the virtual NIC No. 700, the virtual queue No. 710 are recorded as identifiers for the applicable virtual queue 420 in the virtual queue setting data 280 within the virtual NIC emulator 270, and pre-obtained number for the applicable virtual machine 30 are registered in the MAC address 750, and stop is registered in the communication status 780, and a 0 is registered in the transmission buffer address 790 and the receiving buffer address 795.

In the above described processing, the virtual machine No. 620, the virtual NIC No. 700, the virtual queue No. 710 are set in the physical queue assignment table 320 as shown by the second entry in FIG. 7 however the physical NIC No. 650 and the physical queue No. 660 are set to the non-assigned state. Namely, only the virtual NIC410 and the virtual queue 420 are assigned to the virtual machine 30, and the physical queue 180 is in a state not corresponding to the applicable virtual queue 420. In the virtual queue setting data 280, an entry of "0" (0=non set) is generated for the transmission buffer address 790 and the receiving buffer address 795 in the virtual queue No. 710, and an entry of "stop" is generated as the communication status 780.

Figure 18:
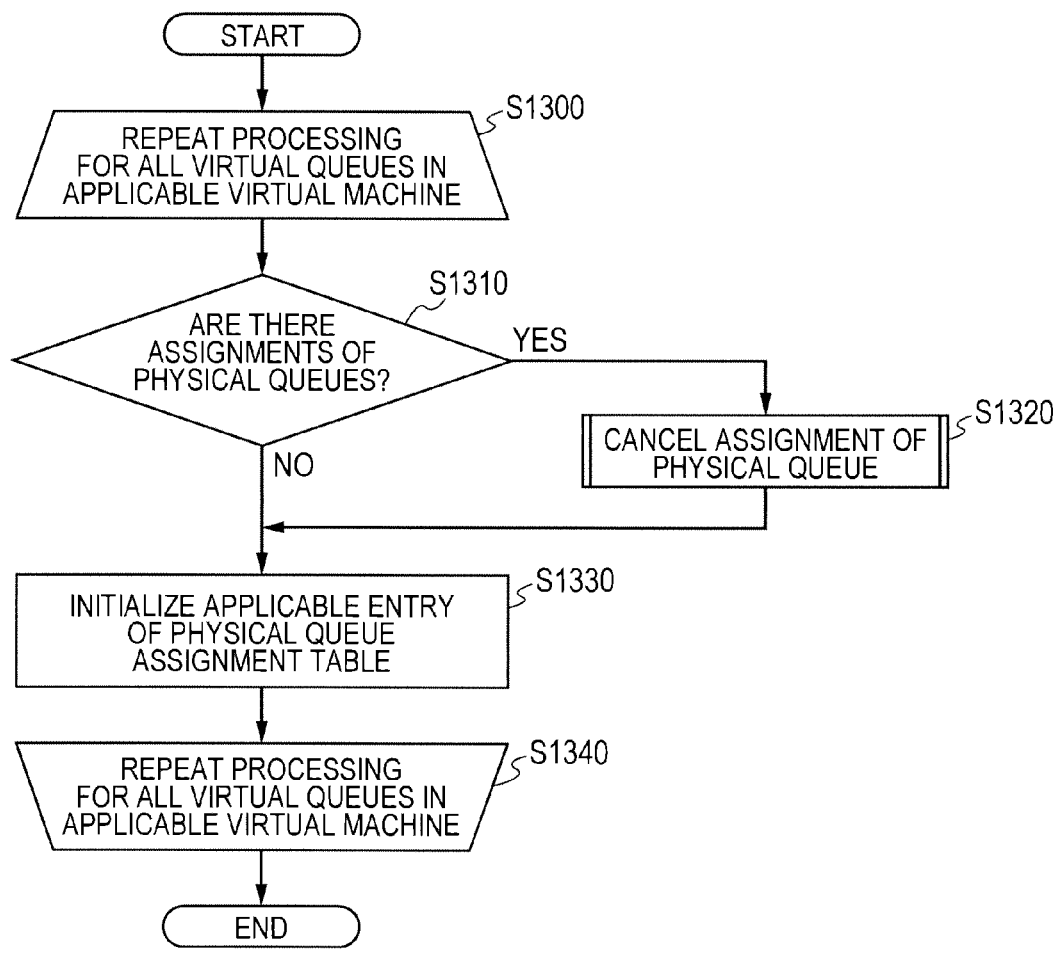
FIG. 18 is a flowchart showing one example of the termination processing of the virtual machine by the hypervisor in the first embodiment of the present invention.

FIG. 18 is a flowchart showing one example of the termination processing performed by the hypervisor 20 in S1040 in FIG. 15. The hypervisor 20 repeats the steps S1310 through S1330 for all the virtual queues 420 contained in the virtual machines 30 that received the termination command to rewrite each table contained in the queue assignment management unit 300.

In step S1310, a search is made of the physical queue assignment table 320, and a decision is made on whether there is a physical queue 180 assigned to the virtual queue 420 in the virtual machine 30 for termination. If there is an assigned physical queue 180, and in that case only, then the processing transitions to step S1320, and the physical queue 180 assignment is canceled. This processing is described in detail in FIG. 19. In step 1330, the hypervisor 20 deletes the information on the applicable virtual queue 420 from the physical queue assignment table 320.

The hypervisor 20 next releases the machine resources assigned to the virtual machine 30 that received the termination instruction, and terminates the virtual machine 30.

Figure 19:
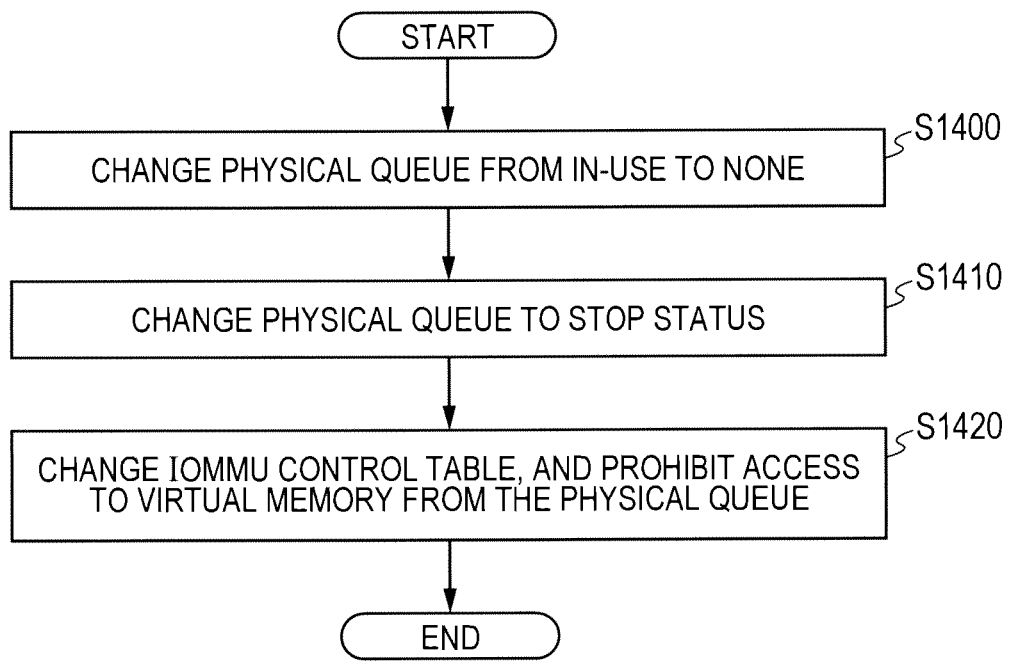
FIG. 19 is a flowchart showing one example of the processing by the hypervisor for cancelling the physical queue assignment in the first embodiment of the present invention.

FIG. 19 is a flowchart showing one example of the processing by the queue assignment management unit 300 for cancelling the assignment of the physical queue 180 such as in S1320 in FIG. 18. In step S1400, the queue assignment management unit 300 rewrites entries relating to the physical queue 180 for terminating the virtual machine 30 in the physical queue usage table 260 and sets a "None" in the In-use 670.

Next in step S1410, the queue assignment management unit 300 summons the VF driver 250, and stops the physical queue 180 corresponding to the virtual machine 30 for terminating. In step S1420, the queue assignment management unit 300 deletes the entry for VF170 containing the applicable physical queue 180 from the IOMMU control table 210, and prohibits the applicable physical queue 180 from directly accessing the virtual memory 400.

The above process cancels the assignment of the physical queue 180 to the virtual queue 420 of the virtual machine 30 whose usage is to be terminated, and the applicable physical queue 180 transitions to an available resource.

Figure 20:
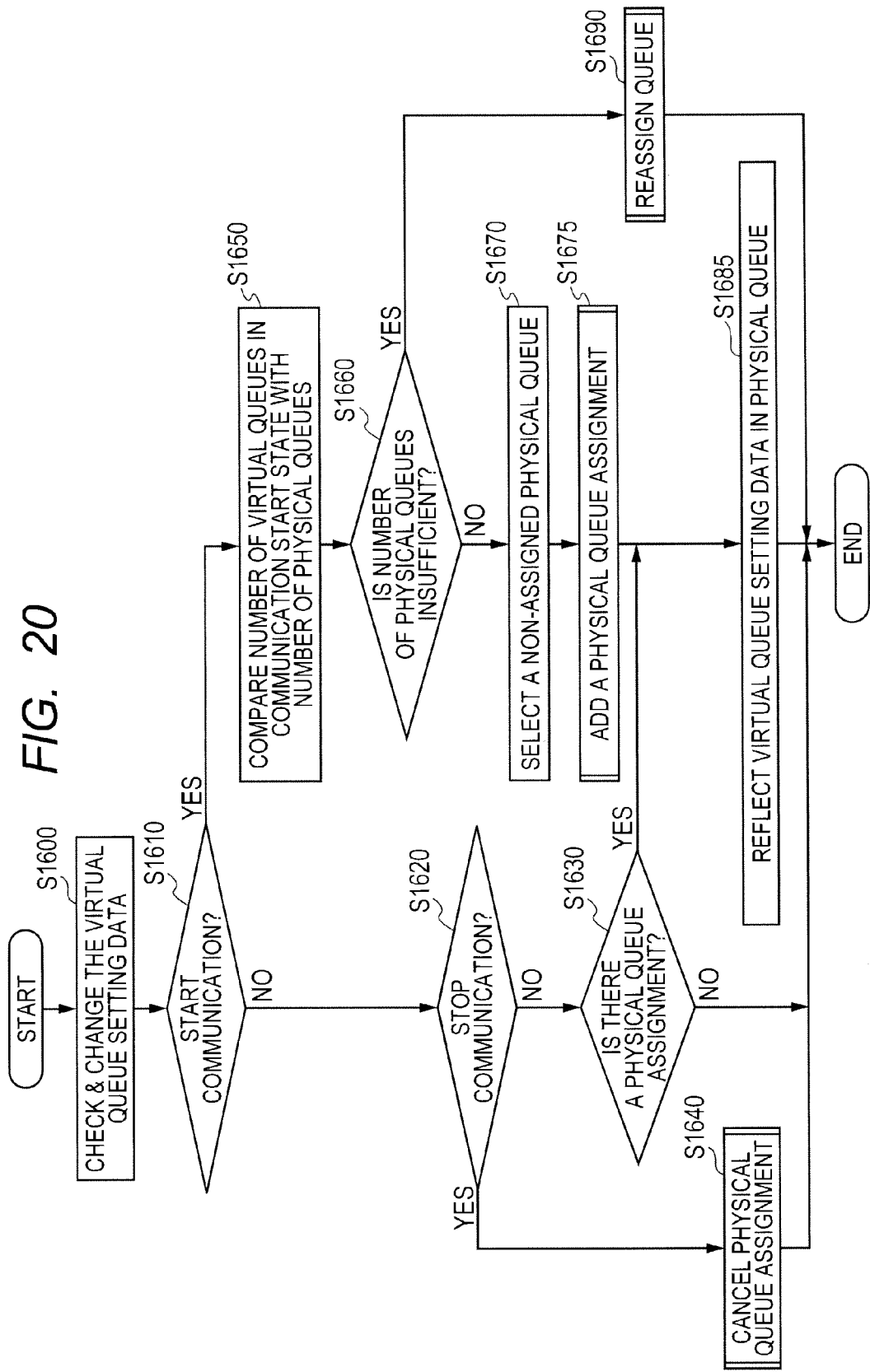
FIG. 20 is a flowchart showing one example of the hypervisor processing when there is a virtual queue operation in the first embodiment of the present invention.

FIG. 20 is a flowchart showing one example of the virtual NIC emulator 270 processing in step S1050 of FIG. 15, when operating the virtual queue 420.

In step S1600, the virtual NIC emulator 270 searches the virtual queue setting data 280 and acquires setup parameters prior to operation for the virtual queue 420 targeted for operation. The virtual NIC emulator 270 next rewrites the virtual queue setting data 280 with new parameters for the virtual queue 420 received from the console 130, etc.

In step S1620, the virtual NIC emulator 270 next compares the setup parameters from before and after the operation, and decides if the communication status 780 changed from "Stop" to "Start." If the communication status 780 has changed from "Stop" to "Start", then the processing transitions to S1650, the NIC emulator 270 requests processing from the queue assignment management unit 300, and in all other cases the processing transitions to step S1620.

In step S1620, the virtual NIC emulator 270 compares the setup parameters from before and after the operation, and decides if the communication status 780 changed from "Start" to "Stop." If the communication status 780 has changed from "Start" to "Stop", then the processing transitions to S1640, the virtual NIC emulator 270 makes a request to the queue assignment management unit 300 to cancel the physical queue 180 assignment and in all other cases the processing transitions to S1630.

In step S1630, the queue assignment management unit 300 searches the physical queue assignment table 320, and decides whether or not a physical queue 180 was assigned to the virtual queue 420 targeted for operation. If the physical queue 180 was assigned to the virtual queue 420 targeted for operation then the processing transitions to step S1680, and if there is no physical queue 180 was assigned to the virtual queue 420 then the processing in FIG. 20 is terminated.

Each procedure from step S1650 to step S1675 and the step S1690 is processing by the queue assignment management unit 300 called up when the virtual queue 420 communication starts. In step S1650, the queue assignment management unit 300 searched the virtual queue setting data 280 and calculates the number of virtual queues 420 that were set to "Start" by the communication status 780. The physical queues are only judged as insufficient when the number of calculated virtual queues 420 exceeds the total number of physical queues 180. In this case, the number of virtual queues 420 during communication has exceeded the number of physical queues 180 so that software copying is being performed by the Lv1 VMM 40.

If judged that the physical queues are insufficient in step S1650, then in step S1660 the processing transitions to step S1690, and the physical queue 180 assignment is re-performed. On the other hand, if the number of physical queues is not insufficient then the processing transitions to step S1670.

In step S1670, the queue assignment management unit 300 searches the physical queue usage table 260, and selects a non-assigned physical queue 180 whose User 670 is set to "None." Subsequently in step S1675, the physical queue 180 selected by the queue assignment management unit 300 is assigned to the virtual queue 420 where communication has started.

In step 1685 executed only when the physical queue 180 was assigned to the virtual queue 420, the virtual NIC emulator 270 conveys the communication status 780 and the MAC address 750 held by the virtual queue setting data 280, and the transmission buffer address 790 and the receiving buffer address 795 to the VF driver 250, and reflects each of these settings in the physical queue 180.

The above processing assigns a physical queue 180 to the virtual queue 420 whose communication has started, if the number of physical queues 180 is sufficient. However, if the number of physical queues 180 is insufficient, then the physical queues 180 are reassigned according to the order of priority of the virtual queues 420.

Figure 21:
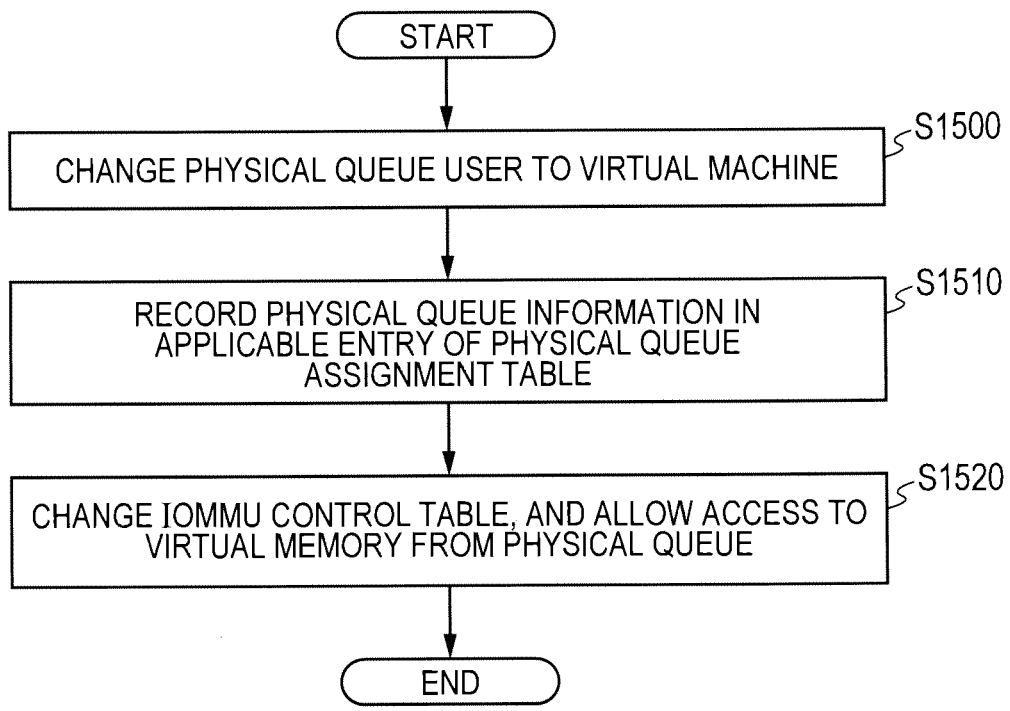
FIG. 21 is a flowchart showing one example of the hypervisor processing to add a physical queue assignment in the first embodiment of the present invention.

FIG. 21 is a flowchart showing one example of processing by the queue assignment management unit 300 to add a physical queue 180 assignment to the virtual queue 420, in S1675 in FIG. 20.

In step S1500, the queue assignment management unit 300 rewrites the entry in the physical queue usage table 260 corresponding to the selected physical queue 180, and stores "Virtual Machine" in the User 670. Next, in step S1510, the queue assignment management unit 300 rewrites the entry in the physical queue assignment table 320 corresponding to the virtual queue 420, and records information on the selected physical queue 180 in the physical NIC No. 650 and the physical queue No. 660. Subsequently in step S1520, the queue assignment management unit 300 adds an entry in the IOMMU control table 210 corresponding to the VF170 containing the physical queue 180 selected by the queue assignment management unit 300, and records the number of the applicable VF170 in the I/O device 640. The queue assignment management unit 300 then copies information in entries matching the virtual machine No. 620 for the virtual machine 30 containing the applicable virtual queue 420 by referring to the physical memory assignment table 200, per the virtual memory beginning address 630, the size 610, and the physical memory beginning address 600 in the IOMMU control table 210. This setting allows direct access from the physical queue 180 to the virtual memory 400 of virtual machine 30.

Figure 22:
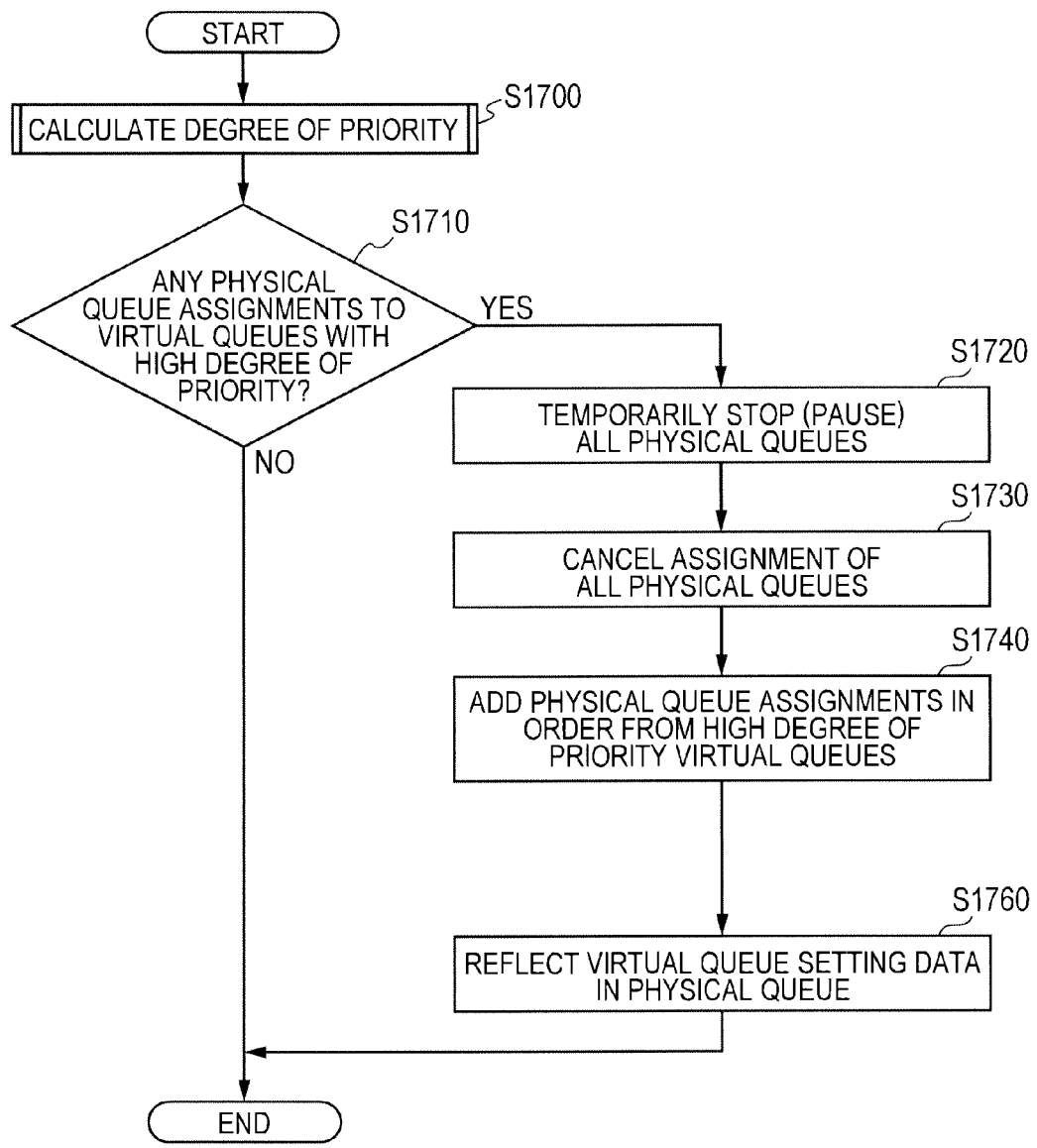
FIG. 22 is a flowchart showing one example of the processing by the hypervisor to reassign a physical queue in the first embodiment of the present invention.

FIG. 22 is a flowchart showing one example of the processing by the queue assignment adjuster unit 310 in step S1690 of FIG. 20 to reassign a physical queue 180 to the virtual queue 420.

In step S1700, the queue assignment adjuster unit 310 calculates the order of priority for assignment of the physical queue 180 to the virtual queue 420. This processing is described in detail in FIG. 23.

Next, in step S1710, the queue assignment adjuster unit 310 searches the physical queue assignment table 320 and decides whether or not there is a missing physical queue 180 assignment to the virtual queue 420 in the order of priority from No. 1 to No. N (N is the total number of physical queues 180). The processing then proceeds to step S1720 only if there is a missing assignment to a high priority virtual queue 420. If there is no missing assignment then this processing ends. A high order of priority indicates a priority that is higher than a specified threshold. The threshold for example may utilize a value to an N-th degree of priority. In the following example, the communication band (Gb/sec) of the I/O device indicates the degree of priority.

In step S1720, the queue assignment adjuster unit 310 instructs the VF driver 250 to change the communication status of all physical queues 180 to "Stop." Next, in step 1730, the queue assignment adjuster unit 310 summons the processing in FIG. 19 for all physical queues 180, and cancels all the physical queue 180 assignments for the virtual queue 420.

In step S1740, the queue assignment adjuster unit 310 selects the non-assigned physical queue 180 from the physical queue usage table 260 in the order of virtual queues 420 having a high order of priority, and summons the processing in FIG. 21 to assign (the selected physical queue 180) to the virtual queues 420.

In step S1760, the queue assignment adjuster unit 310 conveys the communication status 780 and the MAC address 750 held by the virtual queue setting data 280, and the transmission buffer address 790 and the receiving buffer address 795 to the VF driver 250, and reflects each of these settings in the physical queue 180.

In the above processing, the queue assignment adjuster unit 310 can cancel all physical queue 180 assignments when there are no physical queue 180 assignments for high priority virtual queues 420 and when cancelling is complete; reassigns the physical queues 180 to virtual queues 420 whose communication has started, in the order of high priority or in other words, in the order of high communication volume.

Figure 23:
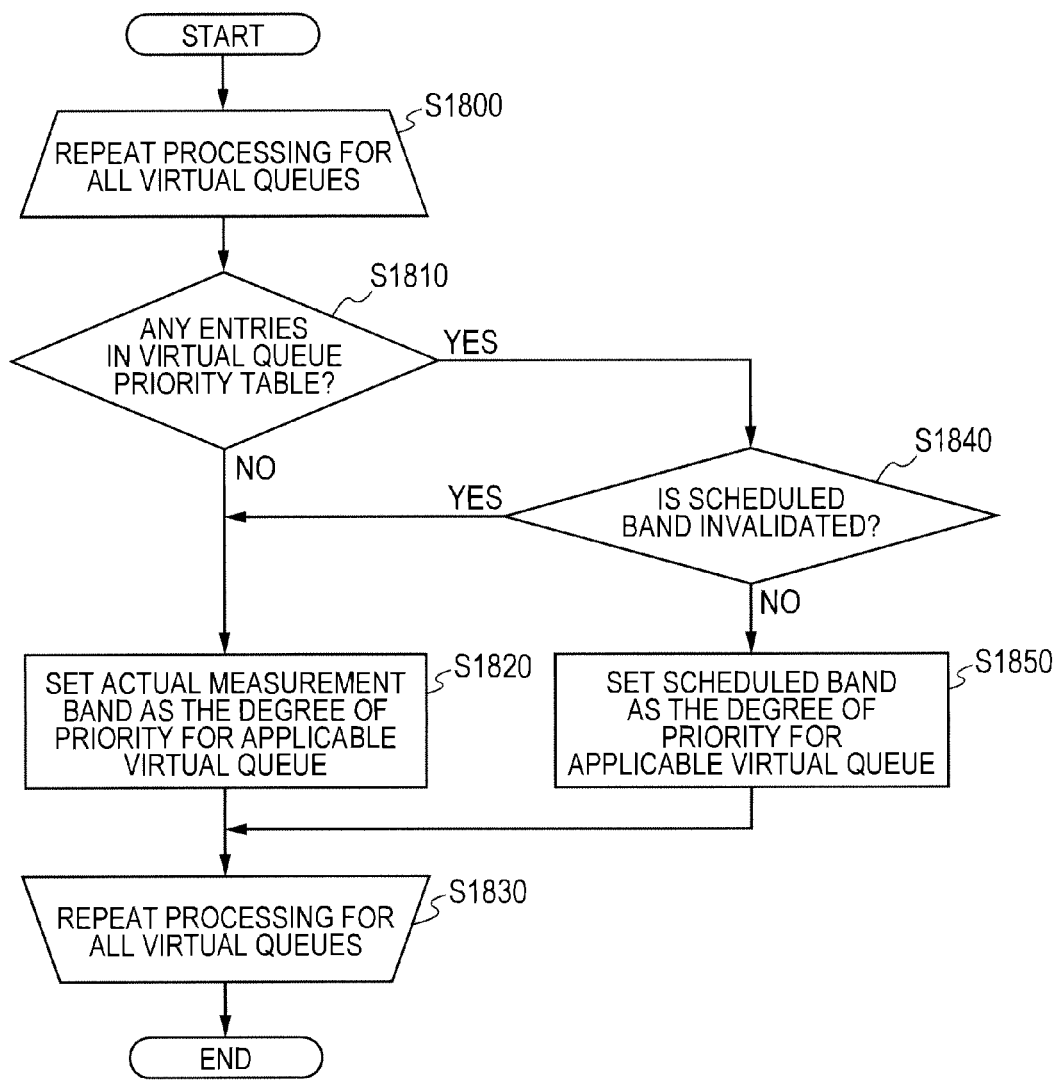
FIG. 23 is a flowchart showing an example of the processing by the hypervisor to calculate the virtual queue assignment priority in the first embodiment of the present invention.

FIG. 23 is a flowchart showing an example of the processing by the queue assignment adjuster unit 310 to calculate the degree of priority for physical queues 180 to the virtual queues 420 in step S1700 of FIG. 22.

As shown in this flowchart, the processing in steps S1800 through S1830 is performed repeatedly for all virtual queues 420 in all virtual machines 30. In step S1810, the queue assignment adjuster unit 310 checks the virtual queue setting data 280 to find the MAC address 750 for the applicable virtual queue 420, and decides whether or not there is a scheduled transfer speed 760 in the virtual queue priority table 340 for the applicable MAC address 750.

The processing proceeds to step S1840 only in the case that there is a registered scheduled transfer speed 760, and in step 1840 further decides whether or not the scheduled transfer speed 760 is not "Invalid." The processing proceeds to step S1850 only in the case that the scheduled transfer speed 760 is "Invalid", and sets the value registered in the scheduled transfer speed 760 as the assignment order of priority for the physical queue 180 to the applicable virtual queue 420.

On the other hand, when the scheduled transfer speed 760 is "Invalid" or there is no order of priority, the queue assignment adjuster unit 310 checks the virtual queue usage quantity table 330 in step S1820, and sets the actual measurement transfer speed 740 as the assignment order of priority for the physical queue 180 to the applicable virtual queue 420.

If the scheduled transfer speed 760 is registered in the virtual queue priority table 340, then the above processing handles this scheduled band (transfer speed) as the order of priority; and if the scheduled transfer speed 760 is not registered then the actual measurement band of the actual measurement transfer speed 740 is handled as the order of priority. A corresponding relation is in this way established to each of the virtual queues 420. This corresponding relation to the virtual queue 420 order of priority can be stored in a table or array not shown in the drawings as the MAC address 750 and order of priority. A field expressing the order of priority may also be provided in the virtual queue priority table 340. The actual measurement transfer speed 740 and scheduled transfer speed 760 indicate the data communication volume per each unit of time, and so the order of priority becomes higher, the larger the data communication volume of the virtual queues 420.

Figure 24:
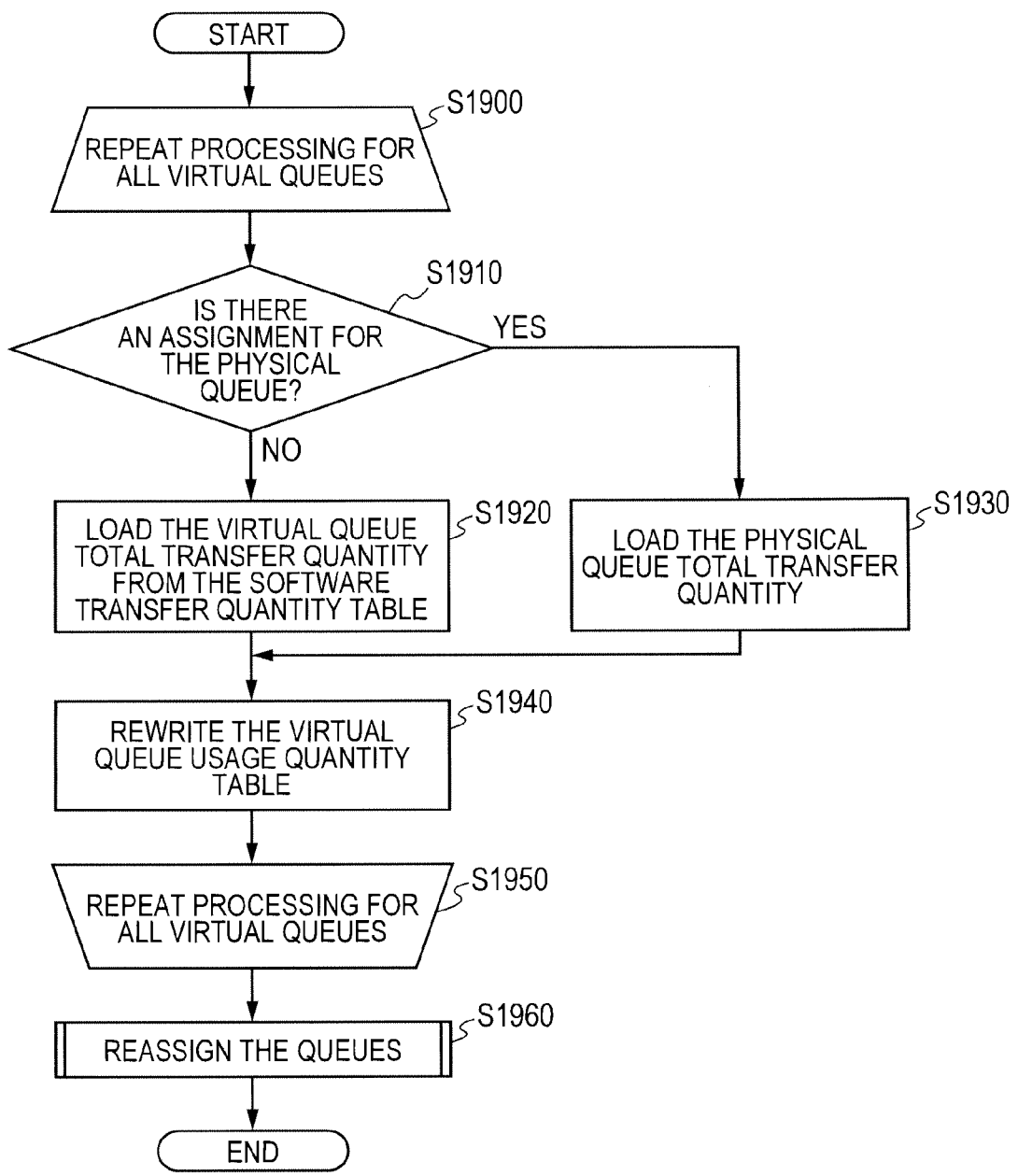
FIG. 24 is a flowchart showing one example of the processing periodically executed by the hypervisor in the first embodiment of the present invention.

FIG. 24 is a flowchart showing one example of the processing periodically executed by the communication band measurement unit 350 in step 1060 of FIG. 15.

The communication band measurement unit 350 repeats the processing between step S1900 and step 1950 for all virtual queues 420 in all the virtual machines 30 at each timer break-in (interrupt) as shown in FIG. 15.

In step S1910, the communication band measurement unit 350 checks the physical queue assignment table 320, and decides if there is a physical queue 180 assignment to the virtual queue 420. If there is a physical queue 180 assignment to the virtual queue 420, then the processing transitions to step S1930, and the communication band measurement unit 350 makes a request to the VF driver 250 of the physical NIC control unit 230 to acquire the hard transfer quantity counter 190 for the applicable physical queue 180. However if there is no physical queue 180 assignment, the processing transitions to step S1920, the communication band measurement unit 350 checks the software transfer quantity table 380 and acquires the total transfer quantity 770 for the applicable virtual queue 420.

Next, in step S1940, the communication band measurement unit 350 obtains the current total transfer amount 720 for the virtual queue usage quantity table 330 and copies it into the preceding total transfer amount 730. The communication band measurement unit 350 also stores the figures acquired in step S1920 or step S1930 into the current total transfer amount 720. The communication band measurement unit 350 calculates the transfer speed by dividing the difference between the current total transfer amount 720 for the virtual queue usage quantity table 330 and the preceding total transfer amount 730 by the execution time periods (timer interrupt periods), and records the transfer speed in the actual measurement transfer speed 740.

In step S1960, the communication band measurement unit 350 summons the processing in FIG. 22 and reflects the order of priority per the actual measurement transfer speed 740 in each physical queue 180 assignment for the virtual queues 420.

The above processing rewrites the current total transfer amount 720, the preceding total transfer amount 730, and the actual measurement transfer speed 740 in the virtual queue usage quantity table 330 at the specified timer interrupt periods. The communication band measurement unit 350 can then perform reassignment of the physical queue 180 in FIG. 22 by utilizing the rewritten actual measurement transfer speed 740.

Figure 25:
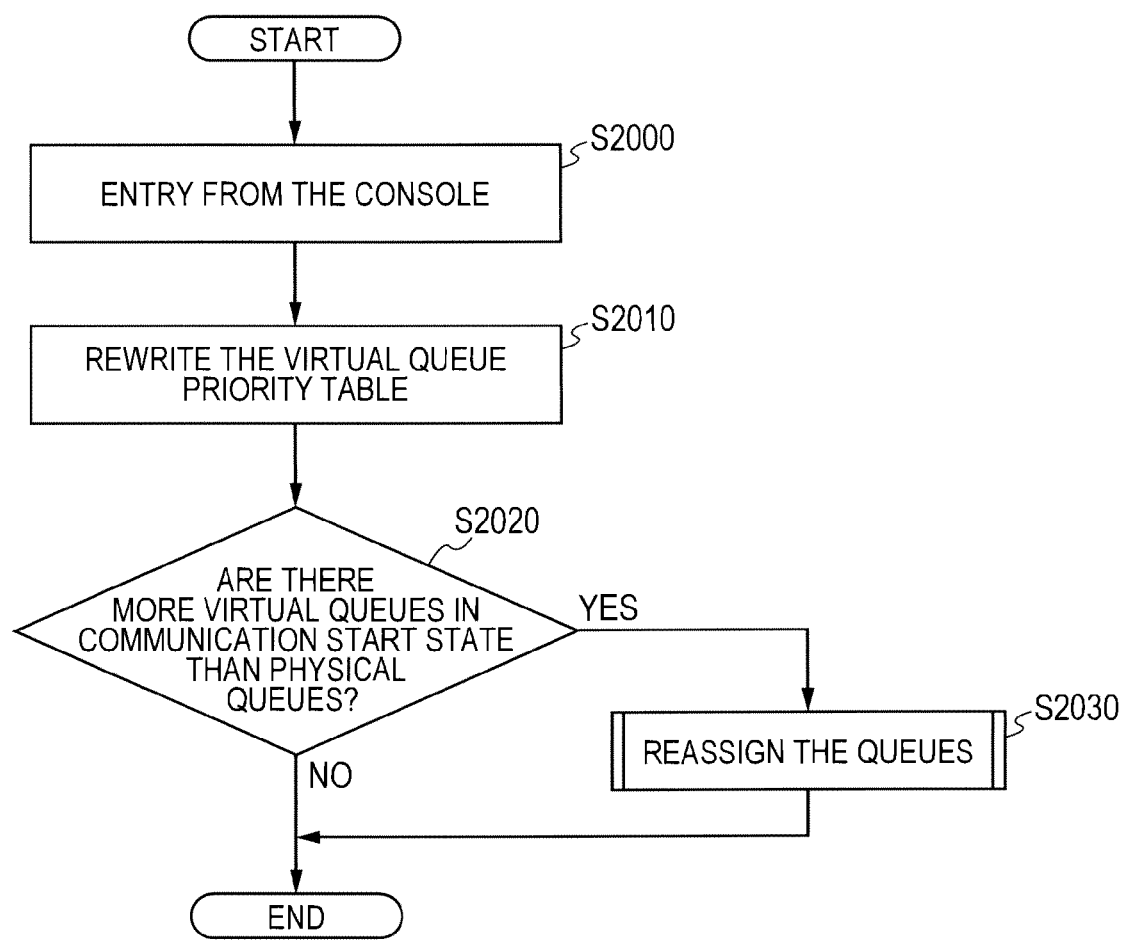
FIG. 25 is a flowchart showing one example of the processing by the hypervisor when there is an entry from the console in the first embodiment of the present invention.

FIG. 25 is a flowchart showing one example of the processing by the UI control unit 220 in the step S1080 in FIG. 15 when there is an entry from the console 130.

In step S2000, the UI control unit 220 receives the MAC address input value 755 and the scheduled transfer speed input value 855 from the console 130 shown on the user interface 131 shown in FIG. 14.

In step 2010, the UI control unit 220 copies the MAC address input value 755 and the scheduled transfer speed input value 855 input from the console 130, into the MAC address 750 and the scheduled transfer speed 760 of the virtual queue priority table 340.

In step S2020, the hypervisor 20 checks the virtual queue setting data 280, and calculates the number of virtual queues 420 that are at communication "Start" in the communication status 780. If the calculated number of virtual queues 420 exceeds the total number of physical queues 180, then the number of physical queues is judged as insufficient. The processing transitions to step S2030 only in the case that the number of physical queues is insufficient, and the physical queues are reassigned by utilizing the value entered on the console 130. The processing of FIG. 22 may be performed as the physical queue 180 reassignment processing.

The above processing reflects the MAC address input value 755 and the scheduled transfer speed input value 855 input from the console 130, into the virtual queue priority table 340, and also executes the physical queue 180 reassignment processing so that changes in the scheduled transfer speed 760 of the virtual queue priority table 340 are reflected in the physical queue 180 assignment to the virtual queue 420.

Figure 26:
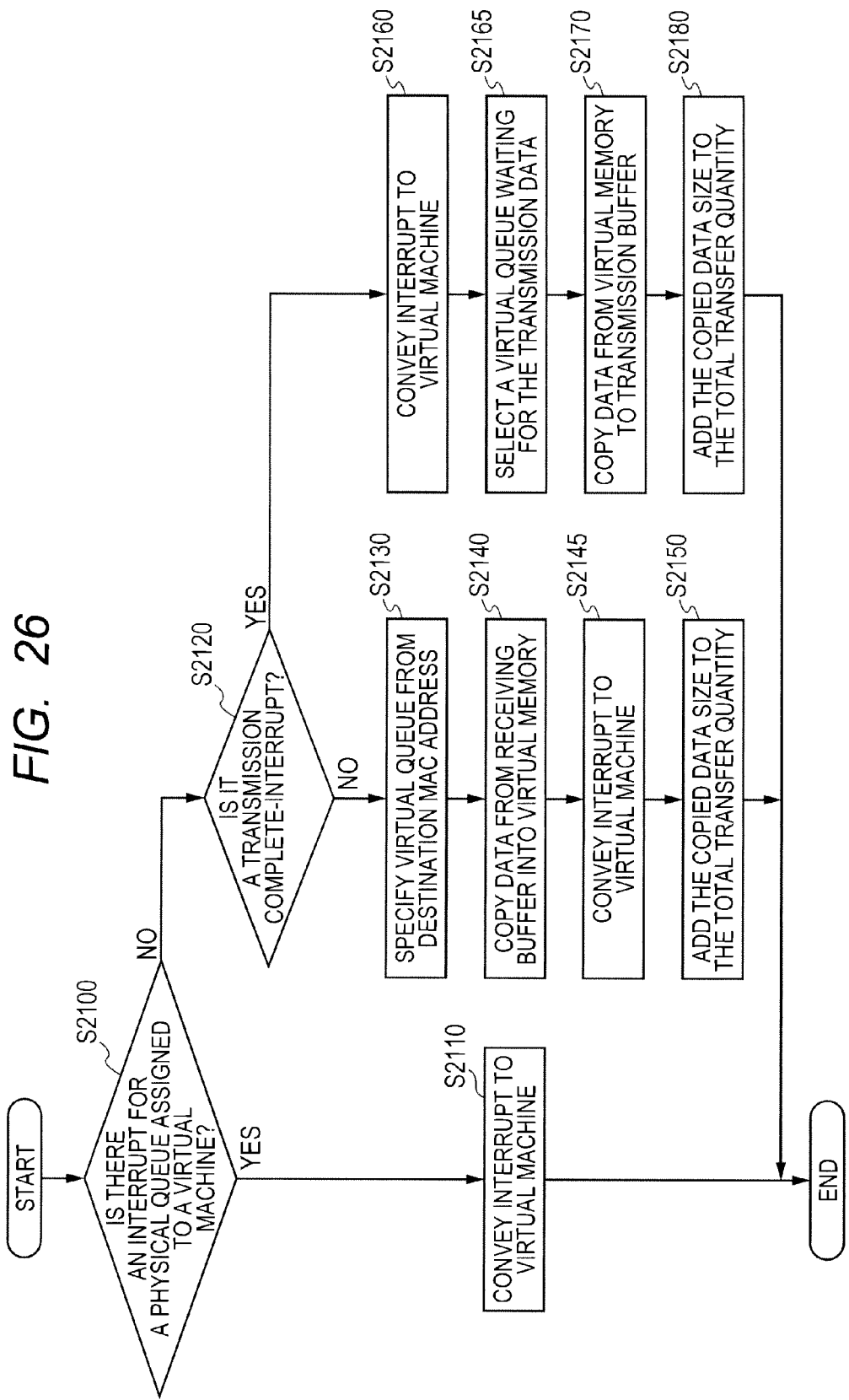
FIG. 26 is a flowchart showing one example of the processing by the hypervisor when there is an interrupt (break-in) from the physical queue in the first embodiment of the present invention.

FIG. 26 is a flowchart showing one example of the processing in step S1070 of FIG. 15, by the hypervisor 20 when there is an interrupt (break-in) from the physical queue 180. The hypervisor 20 checks the physical queue usage table 260 in step S2100, and obtains the object of the received interrupt (break-in) from the User 670. If the object in the User 670 is "Virtual Machine" then the hypervisor 20 decides there is an interrupt (break-in) to the physical queue 180 assigned to the virtual machine 30, and the processing transitions to step S2110. However when the User 670 is not a "Virtual Machine" then the processing transitions to step S2120.

In step S2110, the hypervisor 20 checks the physical queue assignment table 320 and specifies the virtual machine 30 and virtual queue 420 corresponding to the applicable physical queue 180. The hypervisor 20 then sends the interrupt (break-in) to the applicable virtual queues 420 in the specified virtual machine 30 to convey that processing of the virtual queue 420 is complete.

However when the User 670 is at "Software switch", then the processing transitions to step S2120. In step 2120, the hypervisor 20 makes in inquiry to the VF driver 250, and decides whether or not the received interrupt signifies the completion of transmission. If the received interrupt is judged a transmission-complete interrupt by the response from the VF driver 250, then the processing transitions to S2160, and the software switch 360 performs transmission processing.

On the other hand, if the received interrupt is judged as a receive-completion interrupt by the response from the VF driver 250, then the processing transitions to step S2130 and the software switch 360 performs receive processing.

In step S2130, since the received interrupt is a receive-completion interrupt, the data transfer unit 370 of the software switch 360 acquires the destination MAC address for the data received at the receiving buffer 395 from the physical queue 180, checks the virtual queue setting data 280, and specifies the destination virtual queue 420 containing the applicable MAC address 750.

Next, in step S2140, the data transfer unit 370 copies the data within the receiving buffer 395, into the region on the virtual memory 400 specified by the receiving buffer address 795 of the virtual queue setting data 280.

In step S2145, the data transfer unit 370 conveys the interrupt (break-in) indicating that the virtual queue 420 has completed receiving data to the virtual machine 30 containing the applicable virtual queue 420 so that the virtual machine 30 can process the received data.

In step S2150, the data transfer unit 370 adds the data size that was copied in step S2140 to the total transfer quantity 770 of the software transfer quantity table 380. The processing of the receive-complete interrupt is completed in steps S2130 through S2150.

In step S2160, the interrupt is a transmission-complete interrupt so the data transfer unit 370 checks the transmission buffer 395 and acquires the transmit source MAC address, and checks the virtual queue setting data 280, and specifies the destination virtual queue 420 containing the applicable MAC address 750. Moreover, the data transfer unit 370 conveys the interrupt (break-in) notifying that the virtual queue 420 has completed transmitting data to the virtual machine 30 containing the applicable virtual queue 420 in order to allow the virtual machine 30 to transmit the next data.

In step S2165, the data transfer unit 370 selects a virtual queue 420 holding transmission data in a region within the virtual memory 400 specified by the receiving buffer address 795 in the virtual queue setting data 280, from among all virtual queues in all the virtual machines 30. Next in step S2170, the data transfer unit 370 copies the transmission data within the selected applicable virtual memory 400 into the transmission buffer 390.

Next in step S2180, the data transfer unit 370 adds the data size that was copied in step S2170 to the total transfer quantity 770 of the software transfer quantity table 380. The processing of the transmission-complete interrupt is completed in steps S2160 through S2180.

The above processing conveys the interrupt to the virtual machine 30 or executes processing by the software switch 360 when there is an interrupt (break-in) from the hypervisor 20 or the physical queue 180.

4. Lv1 VMM Processing

Figure 27:
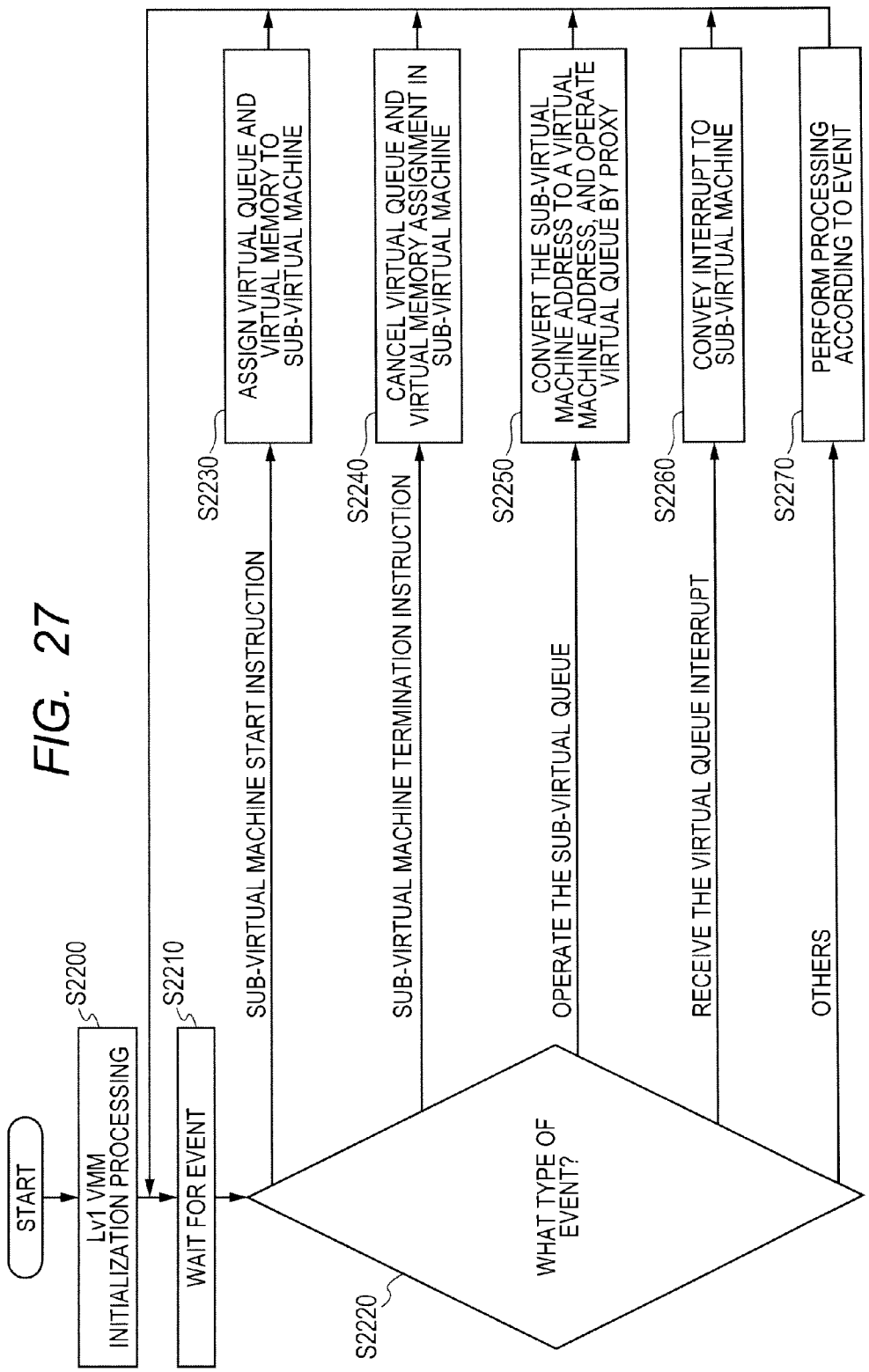
FIG. 27 is a flowchart showing one example of the processing implemented by the Lv1 VMM in the first embodiment of the present invention.

FIG. 27 is a flowchart showing one example of processing implemented by the Lv1 VMM 40. The Lv1 VMM 40 starts processing when the power to the virtual machine 30 is turned on, and in step S2200 initializes each module within the Lv1 VMM 40.

Next, in step S2210, the Lv1 VMM 40 awaits the event such as instructions from the administrator, and in step S2220 summons the processing according to the type of event that occurred.

When the event that occurred was a startup instruction for the sub-virtual machine 50, the processing transitions to step S2230, resources such as the virtual queue 420 and the virtual memory 400 are assigned in the sub-virtual machine 50 and initializing processing for starting up the sub-virtual machine 50 is performed.

When the event that occurred was stop processing for the sub-virtual machine 50, the processing transitions to step S2240, and the machine resources such as the virtual queue 420 and virtual memory 400 are released from the sub-virtual machine 50.

When the event that occurred was a setting change operation for the sub-virtual queue 520 from the Lv2 guest 60, the processing transitions to step S2250, and the settings conveyed to the sub-virtual queue 520 are reflected in the processing in the virtual queue 420. The transmission buffer address or receiving buffer address conveyed from the Lv2 guest 60 are at this time converted from sub-virtual memory 500 addresses to the virtual memory 420 addresses. This processing allows the virtual queue 420 to directly access the sub-virtual memory 500.

When the event that occurred was receiving of an interrupt notifying of the end of processing of the virtual queue 420, the processing transitions to step S2260, and an interrupt is conveyed to the sub-virtual machine 50 urging the Lv2 guest 60 to operate the next sub-virtual queue 520.

If the event that occurred was other than the above events then the processing transitions to step S2270, and the same processing as with a typical hypervisor 20 is performed according to the event that occurred.

The processing in the above S2230 through S2270 can be implemented the same as the hypervisor 20 processing shown in FIG. 15; and the Lv1 VMM 40 can perform the processing on the sub-virtual queue 520 of the sub-virtual NIC.

5. Summary

The above configuration and processing allows the hypervisor 20 to assign physical queues 180 contained within the physical NIC 150 conforming to SR-IOV standards to the virtual queues 420 within the virtual machine 30. The above configuration and processing further allows the physical queue 180 to directly access the virtual memory 400 within the virtual machine 30 by way of the IOMMU control table 210. Moreover, the hypervisor 20 loads a virtual multi-queue NIC in the virtual machine 30 so that the Lv1 VMM 40 on the virtual machine 30 assigns each virtual queue 420 to the sub-virtual machine 50, and each virtual queue 420 can directly access the sub-virtual memory 500 on the sub-virtual machine 50 by way of the address converter process S2250 (refer to FIG. 27).

Results from these assignments and allowing access are that since the physical queue 180 can directly access the sub-virtual memory 500, the hypervisor 20 and Lv1 VMM 40 software copying can be avoided and a peak band for the physical NIC 150 as the I/O device can be obtained.

In the present invention, each virtual machine 30 holds the same number of virtual queues 420 as the physical queues 180 retained in the physical computer 10, and the physical queues 180 can be assigned at any time to the virtual queues 420 whose usage has started, so that a deterioration in the communication band of the sub-virtual machine 50 can be avoided when the number of sub-virtual machines 50 after startup of the virtual machine 30 has increased or decreased due to live migration, etc.

Second Embodiment

In this embodiment, a configuration and a control method are described that do not require a physical NIC or IOMMU conforming to SR-IOV standards. In the present embodiment queues loaded in a non-standard multi-queue NIC typified by VMDq are assigned to the sub-virtual machine, and software copying is avoided by address verification processing by the hypervisor.

1. Hardware Structure

The configuration example of the physical computer for driving the virtual machine system of this embodiment of the present invention is identical to FIG. 1 of the first embodiment so a description is omitted here. The point where the present embodiment differs from the first embodiment is that the physical NIC 150 contains the above VMDq instead of the SR-IOV in the physical NIC 150 of the first embodiment.

2. Software Configuration

Figure 28:
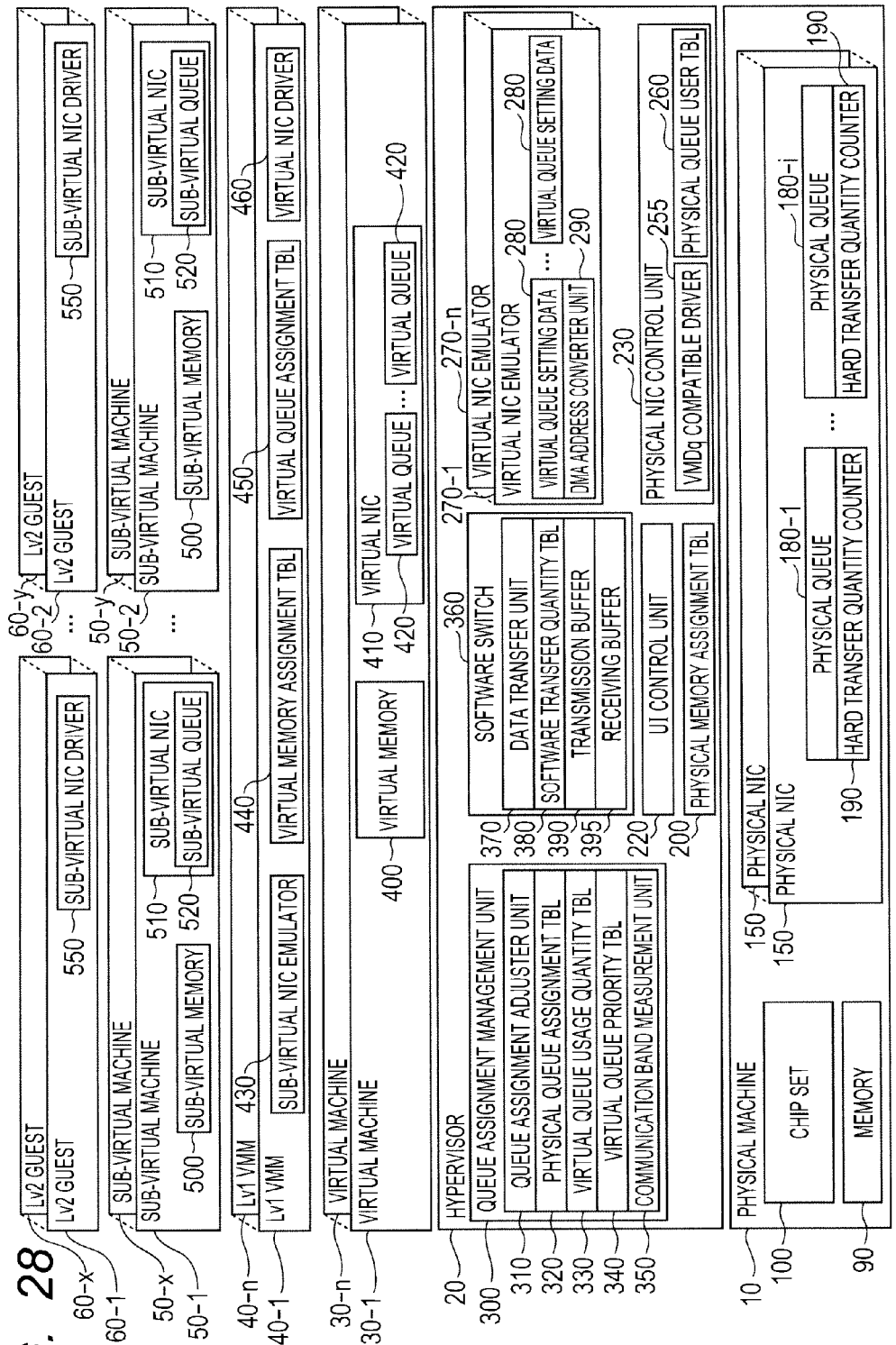
FIG. 28 is one example of a block diagram showing the relation between the physical computer and the software in the second embodiment of the present invention.

The major units of the software configuration implemented on the physical computer 10, and the hardware elements as objects for control are described in detail while referring to FIG. 28. However, sections having the same functions and configuration as already utilized in the first embodiment as shown in FIG. 1 are assigned the same reference numerals and a description is omitted.

FIG. 28 is one example of a block diagram showing the relation between the physical computer and the software in the second embodiment of the present invention.

The hypervisor 20 that creates the virtual machine 30 operates on the physical computer 10. The Lv1 VMM 40 that creates the sub-virtual machine 50 operates on the virtual machine 30. The Lv2 guest 60 is run (operated) on the sub-virtual machine 50.

The physical computer 10 includes the memory 90, the physical NIC150, and the ChipSet100. The memory 90 is grouped into virtual machines 30 by the hypervisor 20. The physical NIC150 contains features for the VMDq, and includes plural physical queues 180. The physical NIC150 also includes a hard transfer quantity counter 190 for storing sent and received cumulative data quantities to each physical queue 180.

The hypervisor 20 creates the virtual machines 30, and assigns a portion of the memory 90 and physical queues 180 to the virtual machines 30, and provides the virtual memory 400 and the virtual NIC410. The virtual NIC410 is a multi-queue NIC containing the VMDq features, and include the same number of virtual queues 420 as the physical queues 180 contained in the physical computer 10.

The hypervisor 20 includes a queue assignment management unit 300 to manage the assignment of the physical queue 180 to the virtual queue 420; a software switch 360 to switchover the network frame sending/receiving functions of the virtual queue 420 when the physical queue 180 is insufficient; virtual NIC emulators 270 to simulate the virtual NIC410 processing; a physical NIC control unit 230 to control the physical NIC150; a physical memory assignment table 200 to store the range of the memory 90 assigned as the virtual memory 400; and a UI (user interface) control unit 220 to receive memory and queue assignment requests and so on from the administrator.

The queue assignment management unit 300 and the software switch 360 are identical to the first embodiment so a description is omitted.

The virtual NIC emulator 270 holds virtual queue setting data 280 containing the communication start or stop status or addresses in the region on the virtual memory 400 for check or rewrite by the virtual queue 420; in each virtual queue 420. The virtual NIC emulator 270 contains a DMA address converter unit 290 that converts the virtual memory 400 addresses conveyed as setup parameters for the virtual queue 420, into addresses in the memory 90 to allow direct access to the virtual memory 400 from the physical queue 180.

The physical NIC control unit 230 includes a VMDq compatible driver 255 for operating each physical queue 180 and the hard transfer quantity counter 190, and a physical queue usage table 260 for managing either the virtual machine 30 or the hypervisor 20 depending on which handles the physical queues 180.

The Lv1 VMM 40 and the Lv2 guest 60 on the virtual machine 30 are the same as in the first embodiment.

Figure 29:
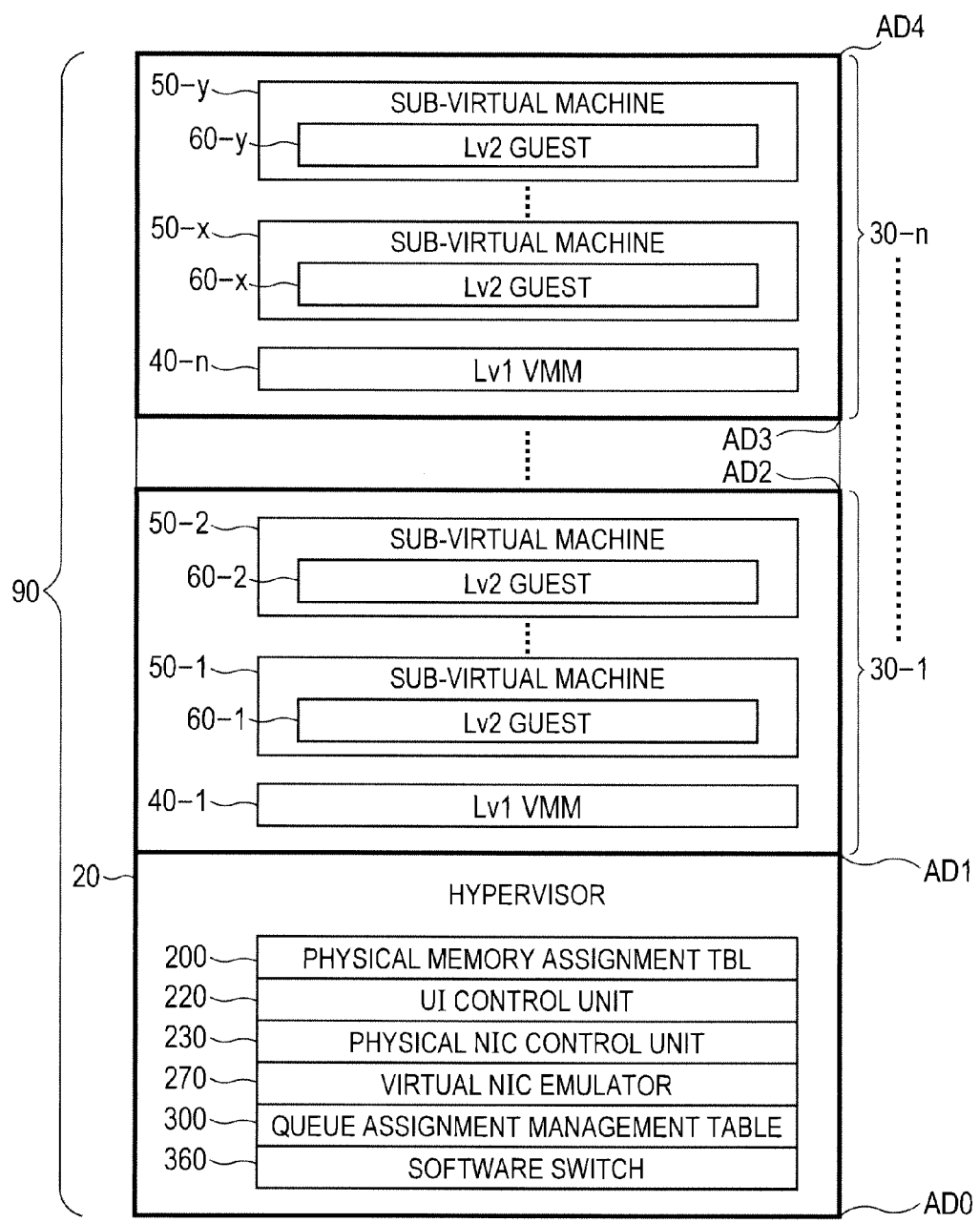
FIG. 29 is an address map showing the content of the physical memory in the second embodiment of the present invention.

FIG. 29 is an example of an address map for the physical memory 90 managed by the hypervisor 20.

The hypervisor 20 assigns a region to place itself on the memory 30 and a region where the virtual 30 is used as the virtual memory 400.

The hypervisor 20 contains a physical memory assignment table 200 the same as the first embodiment, a UI control unit 220, a physical NIC control unit 230, a virtual NIC emulator 270, a queue assignment management unit 300, and a software switch 360. The hypervisor 20 as shown for example in FIG. 29 places its own addresses AD0 through AD1 on each assigned module, assigns the addresses AD1 through AD2 to the virtual machine 30-1, and assigns the addresses AD3 through AD4 to the virtual machine 30-n.

The Lv1 VMM 40 assigns a region on the memory 30 to place itself and assigns a region where the sub-virtual machine 500 is used as the sub-virtual memory 500. An Lv2 guest 60 is also stored within the sub-virtual machine 50.

The physical memory assignment table 200 that holds the corresponding relation between the virtual machine 30 and the memory 90 is identical to that shown in FIG. 4 in the first embodiment.

The physical queue usage table 260 for holding the usage status of the physical queue 180 is identical to that in FIG. 6 of the first embodiment.

The physical queue assignment table 320 for holding the physical queue 180 assignment to the virtual queue 420 is identical to that in FIG. 7 of the first embodiment.

The virtual queue usage quantity table 330 for holding the frequency of occurrence of the virtual queue 420 is identical to that in FIG. 8 of the first embodiment.

The virtual queue priority table 340 for holding the assignment priority of the virtual queues 420 is identical to that in FIG. 9 of the first embodiment.

The software transfer quantity table 380 for holding the data quantity of software copied in each virtual queue 420 is identical to that in FIG. 10 of the first embodiment.

The virtual queue setting data 280 for holding the setup parameters conveyed by the Lv1 VMM 40 to the virtual queue 420 is identical to that in FIG. 11 of the first embodiment.

The virtual memory assignment table 440 for storing the corresponding relation of the sub-virtual machine 50 and the virtual memory 400 is identical to that shown in FIG. 12 of the first embodiment.

The virtual queue assignment table 450 for holding the virtual queue 420 assignment to the sub-virtual queue 520 is identical to that shown in FIG. 13 of the first embodiment.

The user interface displayed on the console 130 is the same as that in FIG. 14 of the first embodiment.

3. Hypervisor Processing

An example of processing carried out by the hypervisor 20 in the second embodiment is described next while referring to the following flowchart.

The flowchart showing the overall processing performed by the hypervisor 20 is the same as that in FIG. 15 of the first embodiment.

Figure 30:
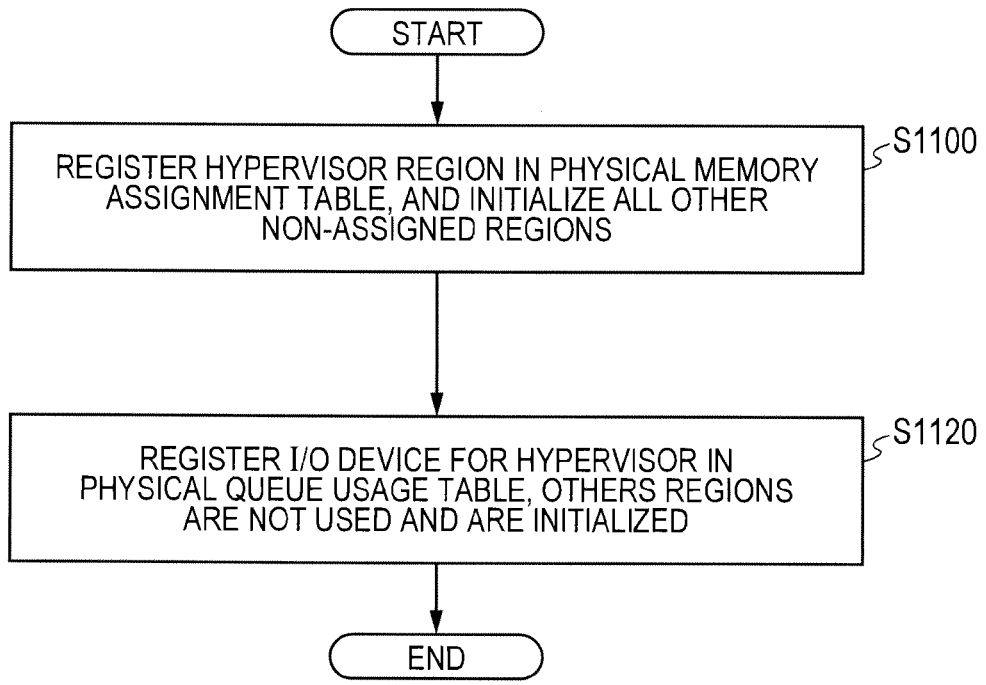
FIG. 30 is a flowchart showing one example of the hypervisor initialization processing in the second embodiment of the present invention.

FIG. 30 is a flowchart showing one example of the hypervisor 20 initialization processing performed in step S1000 in FIG. 15. In step S1100, the hypervisor 20 registers the physical memory beginning address 600 and the size 610 of the memory used by the hypervisor itself, in the first entry of the physical memory assignment table 200, and sets the virtual machine No. 620 and the virtual memory beginning address 630 to "Hypervisor." The hypervisor 20 registers the physical memory beginning address 600 and the size 610 of that overall range other than the hypervisor region into the second entry, and sets the virtual machine No. 620 and the virtual memory beginning address 630 to "Not assigned."

Next, in step S1120, the hypervisor 20 initializes (sets default values) the physical queue usage table 260. The I/O devices used by the hypervisor 20 include the VF170 so that the hypervisor 20 registers the physical NIC No. 650 and the physical queue No. 660 for the applicable VF170, and sets the User 670 to "Software Switch." The VF170 is also included in the I/O devices assigned to the virtual machine 30 so that the In-use 670 is set to "None" for the applicable VF170.

The above processing completes the initializing of the physical memory assignment table 200 and the physical queue usage table 260.

The flowchart showing an example of the startup processing for the virtual machine performed by the hypervisor 20 in step S1030 of FIG. 15 is the same as the processing in FIG. 17 of the first embodiment.

The flowchart showing an example of the termination processing for the virtual machine performed by the hypervisor 20 in step S1040 of FIG. 15 is the same as FIG. 18 of the first embodiment.

Figure 31:
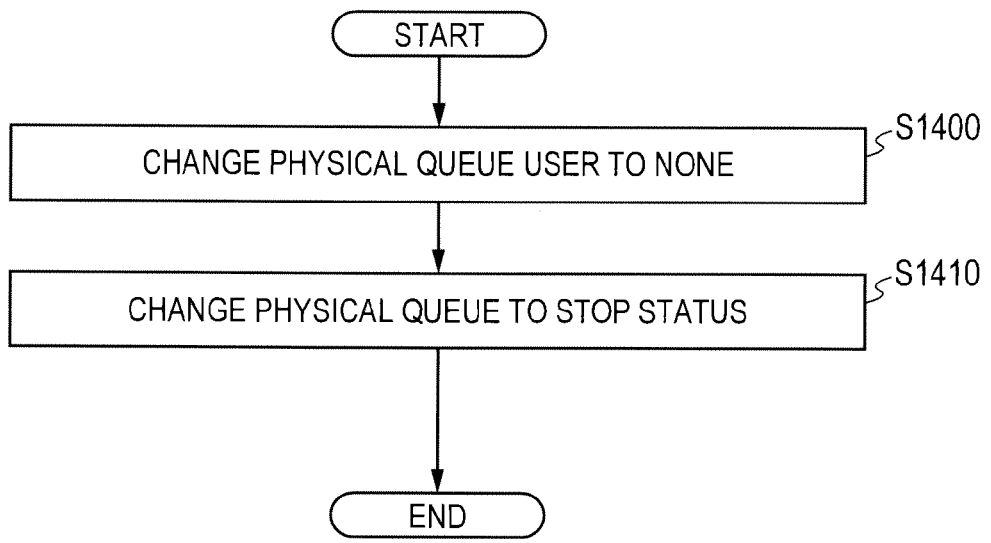
FIG. 31 is a flowchart showing one example of the processing by the hypervisor to cancel the physical queue assignment in the second embodiment of the present invention.

FIG. 31 is a flowchart showing one example of the processing by the queue assignment management unit 300 to cancel the physical queue 180 assignment in step S1320 of FIG. 18.

In step S1400, the queue assignment management unit 300 rewrites entries relating to the applicable physical queue 180 of the physical queue usage table 260 and sets a "None" in the In-use 670. Next, in step S1410, the queue assignment management unit 300 summons the VMDq compatible driver 255 and stops the applicable physical queue 180.

The above process cancels the assignment of the physical queue 180 to the virtual queue 420 of the virtual machine 30 who usage is to be terminated, and the applicable physical queue 180 transitions to an available resource.

Figure 32:
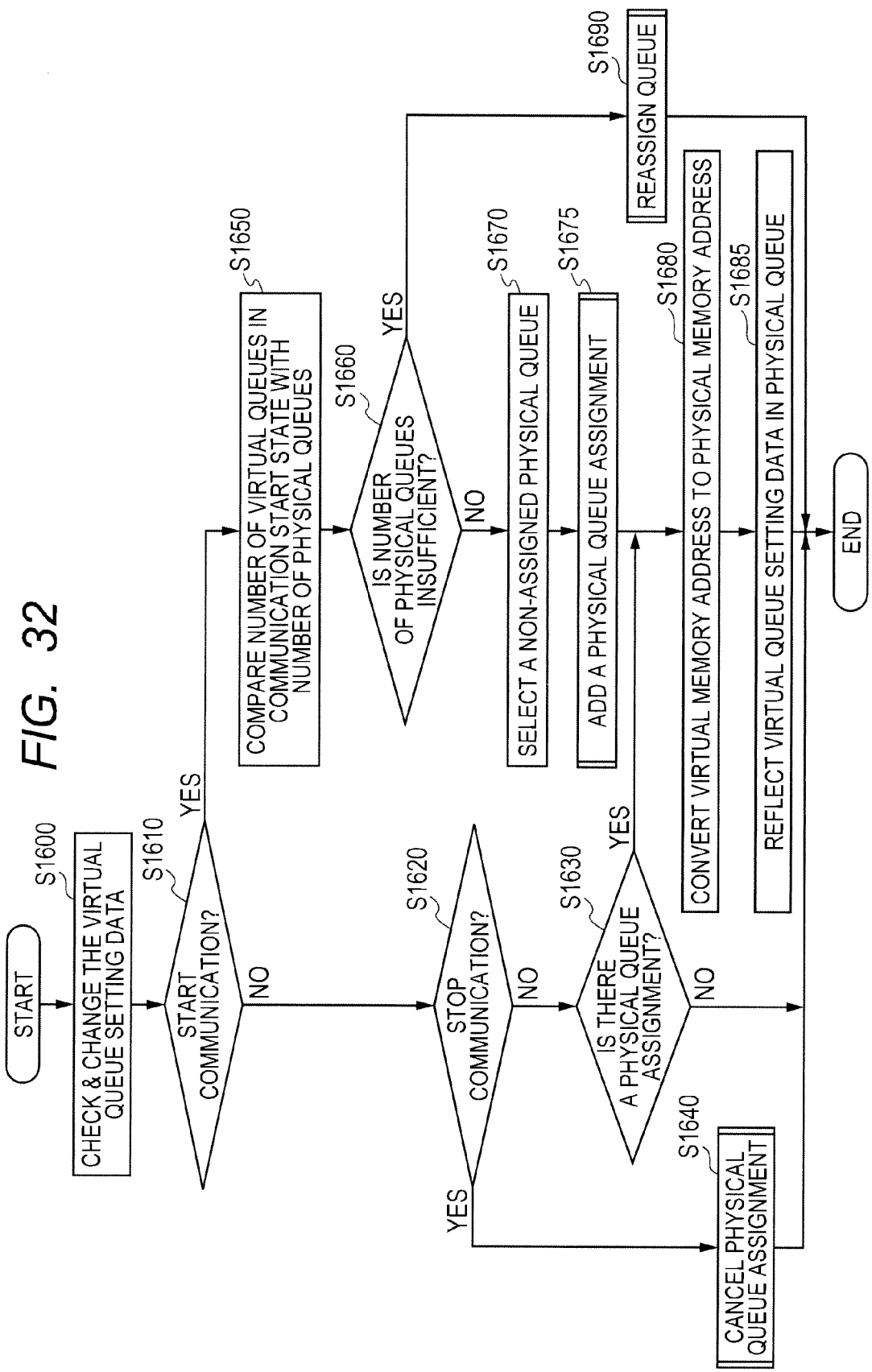
FIG. 32 is a flowchart showing one example of the processing by the hypervisor during virtual queue operation.

FIG. 32 is a flowchart showing one example of the processing by the virtual NIC emulator 270 in step S1050 of FIG. 15 during a virtual queue operation.

In step S1600, the virtual NIC emulator 270 searches the virtual queue setting data 280 for the virtual queue 420 targeted for operating and acquires setup parameter prior to operating. The virtual NIC emulator 270 next rewrites the virtual queue setting data 280 with new setup parameters for the virtual queue 420 received from the console 130, etc.

In step S1610, the virtual NIC emulator 270 next compares the setup parameters from before and after operating the queue, and decides if the communication status 780 changed from "Stop" to "Start." If the communication status 780 has changed from "Stop" to "Start", the processing next transitions to S1650, the virtual NIC emulator 270 requests processing from the queue assignment management unit 300, and in all other cases transitions to step S1620.

In step S1620, the virtual NIC emulator 270 compares the setup parameters from before and after the operation, and decides if the communication status 780 has changed from "Start" to "Stop." If the communication status has changed from "Start" to "Stop", then the processing transitions to S1640, the virtual NIC emulator 270 makes a request to the queue assignment management unit 300 to cancel the physical queue 180 assignment and in all other cases the processing transitions to S1630.

In step S1630, the queue assignment management unit 300 searches the physical queue assignment table 320, and decides whether or not a physical queue 180 was assigned to the virtual queue 420 targeted for operation. If the physical queue 180 was assigned to the virtual queue 420 targeted for operation then the processing transitions to step S1680, and if there is no physical queue 180 assigned to the virtual queue 420 then the processing in FIG. 32 is terminated.

Each procedure from step S1650 to step S1675 and the step S1690 is processing by the queue assignment management unit 300 summoned when the virtual queue 420 communication starts. In step S1650, the queue assignment management unit 300 searched the virtual queue setting data 280 and calculates the number of virtual queues 420 that were set to "Start" by the communication status 780. The physical queues are only judged as insufficient when the number of calculated virtual queues 420 exceeds the total number of physical queues 180.

If judged that the physical queues are insufficient in step S1650, then in step S1660 the processing transitions to step S1690, and the physical queue 180 assignment is re-performed. On the other hand, if the number of physical queues 180 is not insufficient then the processing transitions to step S1670.

In step S1670, the queue assignment management unit 300 searches the physical queue usage table 260, and selects a non-assigned physical queue 180 where the User 670 is set to "None." Subsequently in step S1675, the physical queue 180 selected by the queue assignment management unit 300 is assigned to the virtual queue 420 where communication has started.

The step S1680 and the step S1685 are executed only in the case that the physical queue 180 is assigned to the virtual queue 420. In step S1680, the DMA address converter unit 290 within the virtual NIC emulator 270 checks the physical memory assignment table 200, and converts the virtual memory 400 addresses (equivalent to transmission buffer address 790 and receiving buffer address 795) set in the virtual queue 420, into addresses in the physical memory 90.

Next, in step 1685, the virtual NIC emulator 270 conveys the MAC address 750 and the communication status 780 held by the virtual queue setting data 280 and the address for the physical memory found in the upstream device in step S1680 in the VMDq compatible driver 255, and reflects each setting in the physical queue 180.

The above processing sets the physical memory address corresponding to the address in the virtual memory 400, into the physical queue 180 so that direct access from the applicable physical queue 180 to the physical memory assigned to the virtual machine 30 is allowed. Also if the number of physical queues 180 is adequate (or sufficient), then the same as in the first embodiment, a physical queue 180 is assigned to the virtual queue 420 whose communication has started. However when the number of physical queues 180 is insufficient then reassignment of physical queues 180 is performed according to the order of priority of the virtual queues 420.

Figure 33:
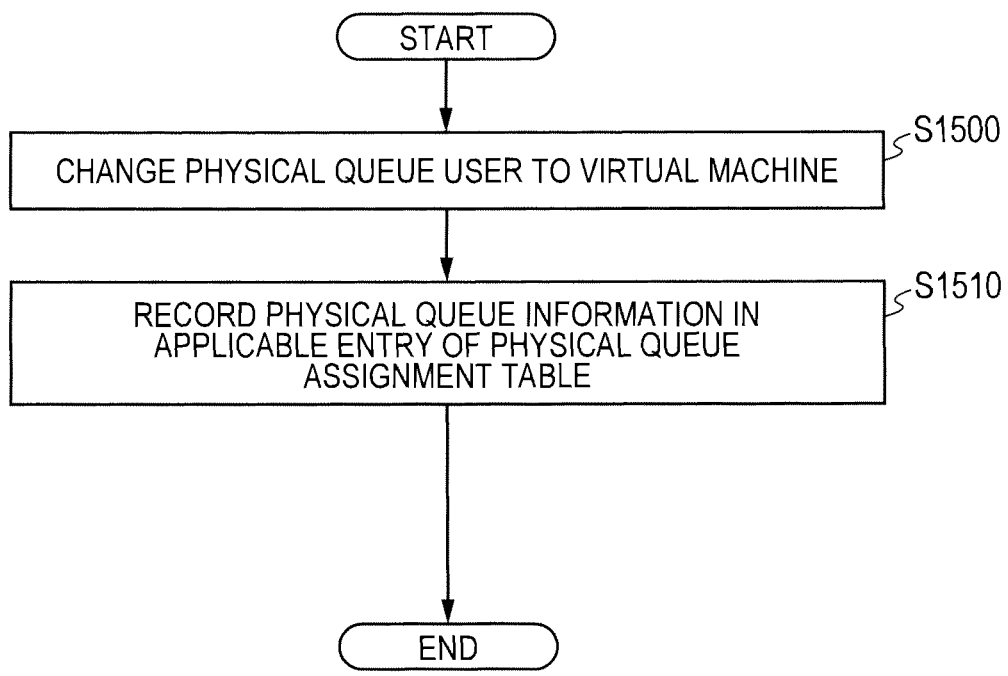
FIG. 33 is a flowchart showing one example of the hypervisor processing to add a physical queue assignment in the second embodiment of the present invention.

FIG. 33 is a flowchart showing one example of the processing by the queue assignment management unit 300 to add a physical queue 180 assignment to the virtual queue 420, in S1675 in FIG. 32.

In step S1500, the queue assignment management unit 300 rewrites the entry in the physical queue usage table 260 corresponding to the selected physical queue 180, and stores "Virtual Machine" in the User 670. Next, in step S1510, the queue assignment management unit 300 rewrites the entry in the physical queue assignment table 320 corresponding to the virtual queue 420, and records information on the selected physical queue 180 into the physical NIC No. 650 and the physical queue No. 660.

Figure 34:
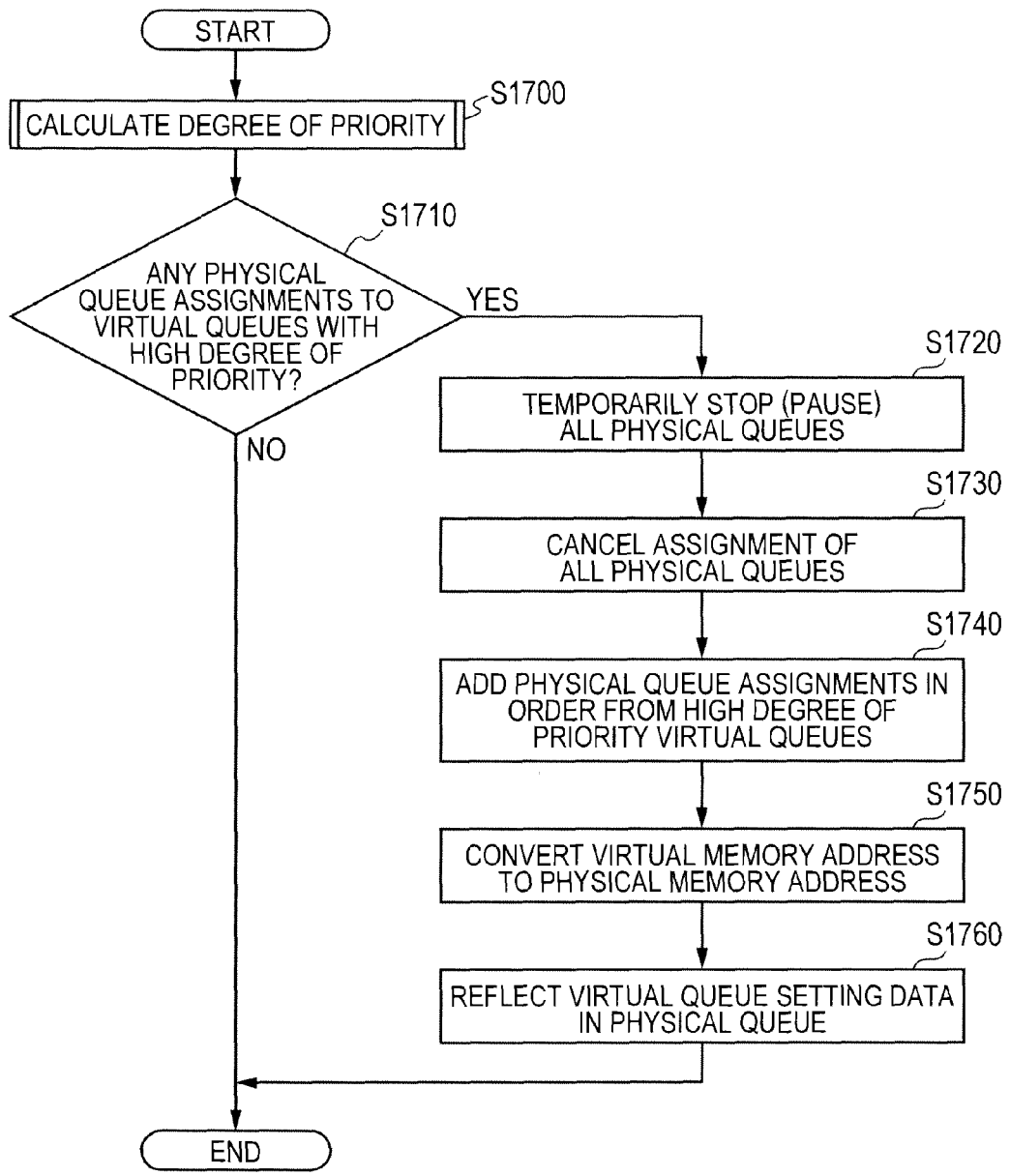
FIG. 34 is a flowchart showing one example of the processing by the hypervisor to reassign a physical queue in the second embodiment of the present invention.

FIG. 34 is a flowchart showing one example of the processing by the queue assignment adjuster unit 310 in step S1690 of FIG. 32 to reassign a physical queue 180 to the virtual queue 420.

In step S1700, the queue assignment adjuster unit 310 calculates the order of priority for assignment of the physical queue 180 to the virtual queue 420. The method for calculating the order of priority for the processing is the same as in FIG. 23 for the first embodiment.

Next, in step S1710, the queue assignment adjuster unit 310 searches the physical queue assignment table 320 and decides whether or not there is a missing physical queue 180 assignment to the virtual queue 420 in the order of priority from No. 1 to No. N (N is the total number of physical queues 180). The processing proceeds just to step S1720 only in the event there is a missing assignment to a high priority virtual queue 420. If there is no missing reassignment then this processing ends.

In step S1720, the queue assignment adjuster unit 310 instructs the VMDq compatible driver 250 to change the communication status of all the physical queues 180 to "Stop." Next, in step 1730, the queue assignment adjuster unit 310 summons the processing in FIG. 31 for all the physical queues 180, and cancels all the physical queue 180 assignments.

In step S1740, the queue assignment adjuster unit 310 selects non-assigned physical queue units 180 from the physical queue usage table 260 in the order of virtual queues 420 having a high order of priority number and summons the processing in FIG. 33 to assign (the physical queue 180) to the virtual queues 420.

In step S1750, the queue assignment adjuster unit 310 checks the physical memory assignment table 200, and converts the virtual memory 400 addresses (equivalent to transmission buffer address 790 and receiving buffer address 795) set in the virtual queue 420, into addresses in the physical memory 90.

In step S1760, the queue assignment adjuster unit 310 conveys the communication status 780 and the MAC address 750 held by the virtual queue setting data 280, and the physical memory addresses found in step S1750, to the VMDq compatible driver 250 and reflect each of these settings in the physical queue 180.

The above processing sets the physical memory 90 address corresponding to the virtual memory 400 (transmission buffer address 790 and the receiving buffer address 795) so that direct access from the applicable physical queue 180 to the region on the assigned physical memory 90 on the virtual machine 30 is allowed.

The flowchart showing one example of the processing in step S1700 in FIG. 34 by the queue assignment adjuster unit 310 to calculate the order of priority for assignment of the physical queue 180 to the virtual queues 420 is identical to the processing in FIG. 23 of the first embodiment. The timer interrupt processing periodically performed by the communication band measurement unit 350 in step S1060 in FIG. 15 is identical to the processing in FIG. 24 of the first embodiment. However, in step S1930, instead of the VF driver of the first embodiment, the present embodiment differs in that the communication band measurement unit 350 requests the VMDq compatible driver 255 to acquire the value of the hard transfer quantity counter 190 for the physical queue 180.

The flowchart showing an example of the processing performed by the UI control unit 220 in step S1080 of FIG. 15 during input to the console 130, is identical to that in FIG. 25 for the first embodiment.

The processing performed by the hypervisor 20 in step S1070 of FIG. 15 during an interrupt from the physical queue 180 is the same as FIG. 26 of the first embodiment. However, in step S2120, instead of the inquiry in the first embodiment by the hypervisor 20 to the VF driver 250; the second embodiment differs in the point that the hypervisor 20 enquires to the VMDq compatible driver 255, to decide whether or not the received interrupt signifies transmission is completed. Other processing is the same as FIG. 26 of the first embodiment.

4. Lv1 VMM Processing

The processing by the Lv1 VMM 40 shown in the flowchart is the same as the processing in FIG. 27 of the first embodiment.

5. Summary

The above configuration and processing allows the hypervisor 20 to assign physical queue 180 loaded in the physical NIC150 of the multi-queue containing VMDq features, to the virtual queue 420 within the virtual machine 30 and moreover also allows the physical queues 180 direct access to the virtual memory 400 within the virtual machine 30 by way of address conversion in the transmission and receiving buffer by the DMA address converter unit 290. Moreover, the hypervisor 20 loads a virtual multi-queue NIC into the virtual machine 30 so that the Lv1 VMM 40 on the virtual machine 30 assigns each virtual queue 420 to the sub-virtual machine 50, and each virtual queue 420 can directly access the sub-virtual memory 500 on the sub-virtual machine 50 by way of the address converter process step S2250. Results from these assignments and allowing direct access are that software copying by the hypervisor 20 and Lv1 VMM 40 can be avoided and a peak band (for the physical 150) can be obtained since the physical queue 180 can directly access the sub-virtual memory 500.

Also in the second embodiment each virtual machine 30 holds the same number of virtual queues 420 as the physical queues retained in the physical computer 10, and the physical queues 180 can be assigned at any time to the virtual queues 420 whose usage has started, so that deterioration in the communication band of the sub-virtual machine 50 can be avoided when the number of sub-virtual machines 50 after startup of the virtual machine 30 has increased or decreased due to live migration, etc.

In the first and second embodiments, examples were shown of a physical NIC150 configured from multi-queue NIC as I/O devices (multi-queue I/O devices) containing plural queues however the present invention is also applicable to HBA or CAN (Converged Network Adapter).

The CPU70 is not limited to a homogenous multi-core processor and may utilize a heterogeneous multi-core processor. The ChipSet100 may utilize a configuration included in the CPU70

The first and the second embodiments showed examples of virtual machines operating an Lv1 VMM 40 on the hypervisor 20. However, the present invention can be applied to a virtual machine that operates a virtual machine 30 on the hypervisor 20.

The present invention as described above is therefore applicable to virtual machine or a virtual machine system utilizing I/O devices including plural queues.

What is claimed is:

1. A virtual machine control method for a physical machine including a CPU, a memory, and a multi-queue I/O device containing one or more physical queues that operates a virtualization unit to create virtual machines, the control method comprising:

a first step of generating, by a virtualization unit, a virtual machine by assigning memory regions;

a second step of providing, by the virtualization unit, a virtual multi-queue I/O device containing one or more virtual queues to the virtual machine;

a third step of starting, by the virtual machine, usage of the one or more virtual queues;

a fourth step of assigning, by the virtualization unit, the physical queues to the one or more virtual queues whose usage has started; and a fifth step of allowing, by the virtualization unit, the assigned physical queues for direct access to the memory regions on the virtual machine, wherein the fourth step further includes:

a sixth step of deciding, by the virtualization unit, whether the number of virtual queues whose usage has started, exceeds the number of physical queues contained in the multi-queue I/O device;

a seventh step of acquiring, by the virtualization unit, a communication quantity of the one or more virtual queues; and an eighth step of reassigning the physical queues to the one or more virtual queues in a descending order of communication quantity, when the number of virtual queues whose usage has started exceeds the number of physical queues contained in the multi-queue I/O device.

2. The virtual machine control method according to claim 1, wherein the multi-queue I/O device is a multi-queue NIC including one or more physical queues.

3. The virtual machine control method according to claim 1, wherein the fourth step further includes:
 a ninth step of storing a virtual queue setup parameter in the memory; and
 a tenth step of reflecting the virtual queue setup parameters in a physical queue when the physical queue is assigned to the virtual queue.

4. The virtual machine control method according to claim 1,
 wherein the virtualization unit comprises: a first virtualization unit to create a first virtual machine, and a second virtualization unit operating on the first virtual machine to create a second virtual machine, the second virtualization unit including a second driver to control a virtual queue, and the first virtualization unit including a first driver to control a physical queue,
 wherein the virtual machine control method further comprises an eleventh step of communicating, by the second virtual machine, with the physical queue; and
 wherein the eleventh step further comprises:
 a step of accepting, by the second driver, operating instructions for the virtual queue; and
 a step of accepting, by the first driver, operating instructions for the physical queue.

5. The virtual machine control method according to claim 1, wherein the seventh step comprises:
 a step of acquiring a value on a transfer quantity counter holding a communication quantity of a physical queue already assigned to a virtual queue; and
 a step of setting the acquired value as a total communication quantity of the virtual queue.

6. The virtual machine control method according to claim 1, wherein the eighth step further comprises:
 a step of accepting a degree of priority of a virtual queue; and
 a step of reassigning the physical queues in an order of high degree of priority of virtual queues whose usage has started, when the number of virtual queues whose usage has started, exceeds the number of physical queues contained in the multi-queue I/O device.

7. A virtual machine including a virtualization unit to create virtual machines by assigning regions of a memory, in a physical machine including a CPU, a memory, and a multi-queue I/O device including one or more physical queues,
 wherein the virtualization unit comprises:
 a virtual device emulator configured to provide a virtual multi-queue I/O device containing one or more virtual queues to the virtual machine;
 communication status information to store a usage state indicating whether the one or more virtual queues has started or stopped;
 a queue assignment management unit configured to assign a physical queue to a virtual queue whose usage has started; and
 a module configured to allow the physical queue for access to the memory assigned to the virtual machine,
 wherein the queue assignment management unit comprises:
 a communication band measurement unit to obtain a communication quantity of the one or more virtual queues; and
 a queue assignment adjuster unit configured to
 decide whether or not the number of virtual queues whose usage has started, is greater than the number of physical queues contained in the multi-queue I/O device; and
 reassign the physical queues to the one or more virtual queues in a descending order of communication quantity, when the number of virtual queues whose usage has started exceeds the number of physical queues contained in the multi-queue I/O device.

8. The virtual machine according to claim 7, wherein the multi-queue I/O device is a multi-queue NIC including one or more physical queues.

9. The virtual machine according to claim 7, wherein the virtualization unit comprises:
 virtual queue setting data to store virtual queue setup parameters; and
 a device driver to reflect the virtual queue setup parameters in the physical queue when the physical queue is assigned.

10. The virtual machine according to claim 7,
 wherein the virtualization unit comprises a first virtualization unit configured to create a first virtual machine, and a second virtualization unit configured to operate on the first virtual machine to create a second virtual machine,
 wherein the second virtualization unit includes a second driver configured to control the virtual queues, and the second driver is configured to receive operating instructions for the virtual queues, and
 wherein the first virtualization unit includes: a first driver configured to control the physical queues, and the first driver is configured to receive operating instructions for the physical queues.

11. The virtual machine according to claim 7,
 wherein the multi-queue I/O device includes a transfer quantity counter configured to measure a communication quantity of the physical queue, and
 wherein the communication band measurement unit is configured to obtain a value of the transfer quantity counter holding a communication quantity of physical queues already assigned to virtual queues, and set the value as a total communication quantity of virtual queues having a physical queue assigned thereto.

12. The virtual machine according to claim 7, wherein the queue assignment management unit is configured to receive a degree of priority of the virtual queue, and reassign the physical queues in an order of high degree of priority among virtual queues whose usage has started when the number of virtual queues whose usage has started exceeds the number of physical queues contained in the multi-queue I/O device.

* * * * *